(12) United States Patent
Eyler et al.

(10) Patent No.: US 12,339,134 B2
(45) Date of Patent: *Jun. 24, 2025

(54) PROVIDING INFORMATION TO USERS OF A TRANSPORTATION SYSTEM USING AUGMENTED REALITY ELEMENTS

(71) Applicant: Lyft, Inc., San Francisco, CA (US)

(72) Inventors: Ethan Duncan Eyler, San Francisco, CA (US); Martin Conte MacDonell, San Francisco, CA (US); Taggart Matthiesen, San Francisco, CA (US); Jesse Jones McMillin, San Francisco, CA (US); Robert Earl Rasmusson, Jr., San Francisco, CA (US); Mark David Teater, Oakland, CA (US)

(73) Assignee: Lyft, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/595,574

(22) Filed: Mar. 5, 2024

(65) Prior Publication Data

US 2024/0200963 A1 Jun. 20, 2024

Related U.S. Application Data

(63) Continuation of application No. 17/463,906, filed on Sep. 1, 2021, now Pat. No. 11,927,455, which is a (Continued)

(51) Int. Cl.
*G01C 21/36* (2006.01)
*G01C 21/34* (2006.01)
*G02B 27/01* (2006.01)

(52) U.S. Cl.
CPC ..... *G01C 21/3638* (2013.01); *G01C 21/3407* (2013.01); *G02B 27/01* (2013.01);
(Continued)

(58) Field of Classification Search
CPC ............ G01C 21/3638; G01C 21/3407; G01C 21/3492; G02B 27/01; G02B 27/0101;
(Continued)

(56) References Cited

U.S. PATENT DOCUMENTS 6,045,229 A * 4/2000 Tachi ................. G02B 27/0093
353/121
8,265,865 B2 * 9/2012 Faenger ............... G01C 21/367
701/450

(Continued)

OTHER PUBLICATIONS

U.S. Appl. No. 15/650,833, Apr. 12, 2019, Office Action.
(Continued)

*Primary Examiner* — Luis A Martinez Borrero
(74) *Attorney, Agent, or Firm* — Keller Preece PLLC

(57) ABSTRACT

The present disclosure is directed toward systems and methods for an augmented reality transportation system. For example, the systems and methods described herein present an augmented reality environment for a driver or a passenger including augmented reality elements to mark specific locations within a display of real-world surroundings. Additionally, the systems and methods described herein analyze historical information to determine placements for augmented reality elements. The systems and methods also enable a user to share an augmented reality or virtual reality environment with another user.

20 Claims, 12 Drawing Sheets

Related U.S. Application Data continuation of application No. 15/650,833, filed on Jul. 14, 2017, now Pat. No. 11,118,930.

(52) U.S. Cl.
CPC ..... *G02B 27/0101* (2013.01); *G01C 21/3492* (2013.01); *G02B 2027/0105* (2013.01); *G02B 2027/0112* (2013.01); *G02B 2027/0134* (2013.01); *G02B 2027/014* (2013.01); *G02B 2027/0141* (2013.01)

(58) Field of Classification Search
CPC .... G02B 2027/0105; G02B 2027/0112; G02B 2027/0134; G02B 2027/014; G02B 2027/0141
See application file for complete search history.

(56) References Cited

U.S. PATENT DOCUMENTS

| | | | | |
|---|---|---|---|---|
| 9,208,499 | B2* | 12/2015 | Vande Velde | G06Q 30/0215 |
| 9,488,488 | B2* | 11/2016 | Waldman | G01C 21/3602 |
| 9,558,581 | B2* | 1/2017 | Wang | G06T 15/06 |
| 9,558,590 | B2* | 1/2017 | Westerinen | G06F 3/0346 |
| 9,619,940 | B1* | 4/2017 | Lotto | G06T 19/006 |
| 9,646,422 | B2* | 5/2017 | Fedosov | G06T 15/20 |
| 9,766,712 | B2* | 9/2017 | Schpok | G01C 21/3676 |
| 9,922,446 | B2* | 3/2018 | Wang | G06T 15/06 |
| 10,217,288 | B2* | 2/2019 | Fedosov | G06T 19/006 |
| 10,354,440 | B2* | 7/2019 | Eyler | G06F 3/011 |
| 10,360,714 | B1* | 7/2019 | Xue | G06T 11/60 |
| 10,388,073 | B2* | 8/2019 | Westerinen | G06F 1/1626 |
| 10,403,044 | B2* | 9/2019 | Martin | H04N 1/00244 |
| 10,488,218 | B2* | 11/2019 | Kim | G06T 19/006 |
| 10,591,916 | B2* | 3/2020 | Fairfield | H04W 4/029 |
| D883,302 | S* | 5/2020 | Xue | D14/485 |
| 10,706,620 | B2* | 7/2020 | Eyler | G06F 3/011 |
| 10,769,452 | B2* | 9/2020 | Rasmusson, Jr. | G06V 20/56 |
| 10,977,497 | B2* | 4/2021 | Rogan | G06V 20/56 |
| 11,118,930 | B2* | 9/2021 | Eyler | G02B 27/01 |
| 11,927,455 | B2* | 3/2024 | Eyler | G01C 21/365 |
| 2011/0153198 | A1* | 6/2011 | Kokkas | G01C 21/3647 701/533 |
| 2011/0161875 | A1* | 6/2011 | Kankainen | H04N 1/00323 715/810 |
| 2011/0199479 | A1* | 8/2011 | Waldman | H04N 7/185 701/533 |
| 2012/0176410 | A1* | 7/2012 | Meier | G06T 15/20 345/633 |
| 2012/0194547 | A1* | 8/2012 | Johnson | G06T 11/00 345/632 |
| 2012/0245842 | A1* | 9/2012 | Spindler | G01C 21/3638 701/438 |
| 2013/0173156 | A1* | 7/2013 | Wither | G01C 21/3682 701/400 |
| 2013/0194110 | A1* | 8/2013 | Kim | G06V 40/165 340/905 |
| 2015/0062168 | A1* | 3/2015 | Ng-Thow-Hing | B60K 35/23 345/633 |
| 2015/0262428 | A1* | 9/2015 | Tatzgern | G06F 3/017 345/633 |
| 2015/0317057 | A1* | 11/2015 | Choi | G01C 21/3673 715/757 |
| 2016/0034828 | A1* | 2/2016 | Sarawgi | G06Q 10/00 705/5 |
| 2016/0147416 | A1* | 5/2016 | MacFarlane | G06F 3/04817 715/747 |
| 2016/0240011 | A1* | 8/2016 | Fedosov | G01C 21/3611 |
| 2017/0103571 | A1* | 4/2017 | Beaurepaire | G06F 3/011 |
| 2017/0153714 | A1 | 6/2017 | Gao et al. | |
| 2017/0205885 | A1* | 7/2017 | Schpok | G01C 21/26 |
| 2017/0330585 | A1* | 11/2017 | Bostick | H04L 51/066 |
| 2017/0343375 | A1* | 11/2017 | Kamhi | G06T 11/60 |
| 2018/0033208 | A1* | 2/2018 | Martin | H04N 1/00244 |
| 2018/0040162 | A1* | 2/2018 | Donnelly | G02B 27/0093 |
| 2018/0040163 | A1* | 2/2018 | Donnelly | B60R 1/22 |
| 2018/0136000 | A1* | 5/2018 | Rasmusson, Jr. | G06T 7/20 |
| 2018/0136656 | A1* | 5/2018 | Rasmusson, Jr. | B62D 15/0285 |
| 2018/0255285 | A1* | 9/2018 | Hall | G06F 3/011 |
| 2018/0279083 | A1* | 9/2018 | Lubeck | H04W 8/24 |
| 2018/0354509 | A1* | 12/2018 | Mullins | B60K 35/80 |
| 2019/0017839 | A1* | 1/2019 | Eyler | G01C 21/3647 |
| 2019/0019329 | A1* | 1/2019 | Eyler | G06T 19/006 |
| 2019/0139318 | A1* | 5/2019 | Tierney | G06F 3/013 |
| 2019/0156558 | A1* | 5/2019 | Neeter | G06T 17/00 |
| 2020/0082613 | A1* | 3/2020 | Eyler | G01C 21/3837 |
| 2020/0090375 | A1* | 3/2020 | Mori | G02B 27/0101 |
| 2020/0258480 | A1* | 8/2020 | Bronder | B60K 35/233 |
| 2020/0363216 | A1* | 11/2020 | Elvanoglu | G06Q 10/02 |
| 2020/0364931 | A1* | 11/2020 | Eyler | G06T 17/05 |
| 2021/0396539 | A1* | 12/2021 | Eyler | G01C 21/3407 |
| 2022/0036599 | A1* | 2/2022 | Dotterweich | G06Q 10/0838 |

OTHER PUBLICATIONS

U.S. Appl. No. 15/650,833, Jan. 10, 2020, Office Action.
U.S. Appl. No. 15/650,833, Apr. 14, 2020, Office Action.
U.S. Appl. No. 15/650,833, Sep. 25, 2020, Office Action.
U.S. Appl. No. 15/650,833, Feb. 23, 2021, Notice of Allowance.
U.S. Appl. No. 17/463,906, Mar. 27, 2023, Office Action.
U.S. Appl. No. 17/463,906, Aug. 23, 2023, Office Action.
U.S. Appl. No. 17/463,906, Nov. 8, 2023, Notice of Allowance.

* cited by examiner

PROVIDING INFORMATION TO USERS OF A TRANSPORTATION SYSTEM USING AUGMENTED REALITY ELEMENTS

CROSS-REFERENCE TO RELATED APPLICATIONS

This application is a continuation of U.S. patent application Ser. No. 17/463,906, filed on Sep. 1, 2021, which is a continuation of U.S. patent application Ser. No. 15/650,833, filed on Jul. 14, 2017 which issued as U.S. Pat. No. 11,118,930. Each of the aforementioned applications are hereby incorporated by reference in their entirety.

BACKGROUND

Transportation services (e.g., ride share services, taxi services, etc.) provide a way for users to travel from one place to another with relative ease. For example, ride share services enable users to request transportation from nearly any location and at almost any time, without relying on a bus schedule, navigating to a subway station, or even owning a vehicle. To illustrate, a ride share service enables a user to request a driver for roadside pickup and transportation to a desired destination, then matches and assigns a driver for the user based on location and other factors to quickly and efficiently transport the user. With the advent of smartphones, requesting a driver or hailing a taxi is much simpler than before. For instance, a user can utilize a mobile application to request a driver, and, via the location information associated with the smartphone, a nearby driver can accept the request, pick up the user, and deliver the user to a desired destination more efficiently than in times past. However, while conventional transportation systems do provide some benefits, conventional transportation systems nonetheless suffer from disadvantages.

For example, conventional systems sometimes result in a pickup/drop-off experience that is inefficient, confusing, and difficult. For example, by merely providing simplified map information regarding route progress, pickup/drop-off location, status of arrival at a destination, and other similarly generalized information, conventional systems frustrate drivers and passengers alike as to how to most effectively navigate on a more micro scale—i.e., on a more detailed level than a location on a roadmap. To illustrate, large cities frequently have more complicated roads with multiple lanes, accompanying sidewalks with pedestrians, traffic signals, bike lanes, train tracks, etc. Also, pedestrians, bikers, and/or other drivers often fail to comply with traffic laws and act unpredictably to a conventional system. However, conventional transportation systems sometimes fail to properly account for these complexities when providing information and instructions to passengers and drivers.

These and other disadvantages exist with regard to conventional transportation systems.

SUMMARY

The present application discloses various embodiments of improved transportation systems and corresponding processes. Specifically, the present application discloses systems and methods for using augmented reality ("AR") experiences based on historical data to provide information and instructions to users (passengers and drivers) of transportation systems. As one example and as will be explained in more detail below, the systems and methods described herein generate three-dimensional virtual objects (e.g., augmented reality elements) to overlay on a user's view of real-world surroundings to assist in a pickup or drop-off process.

To illustrate, the systems and methods described herein collect, compile, and analyze information from past "rides" taken by passengers of a transportation system (a transportation network or rideshare system) to build a database of historical ride information. Based on the historical ride information, the disclosed systems are able to, for example, identify an ideal pickup location for a waiting passenger in accordance with the passenger's location, the driver's location, location traffic conditions, location transportation restrictions, etc. After identifying the ideal pickup location, the disclosed systems provide an AR experience to the waiting passenger by providing an AR element representing the ideal pickup location within the passenger's view of the real world (e.g., displayed by an AR device worn or held by the passenger), as will be explained in more detail below. In addition, the disclosed systems can provide additional AR elements representing, for example, a driver's location, a "no pickup" location, or to indicate any other information relevant to the pickup process. Furthermore, the disclosed systems can provide similar AR experiences to drivers to aid in the pickup or in a drop-off process. By providing an AR experience to assist in the pickup/drop-off processes, the disclosed systems are able to provide users (both riders and drivers) with a more efficient, enjoyable, and well-informed transportation experience.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
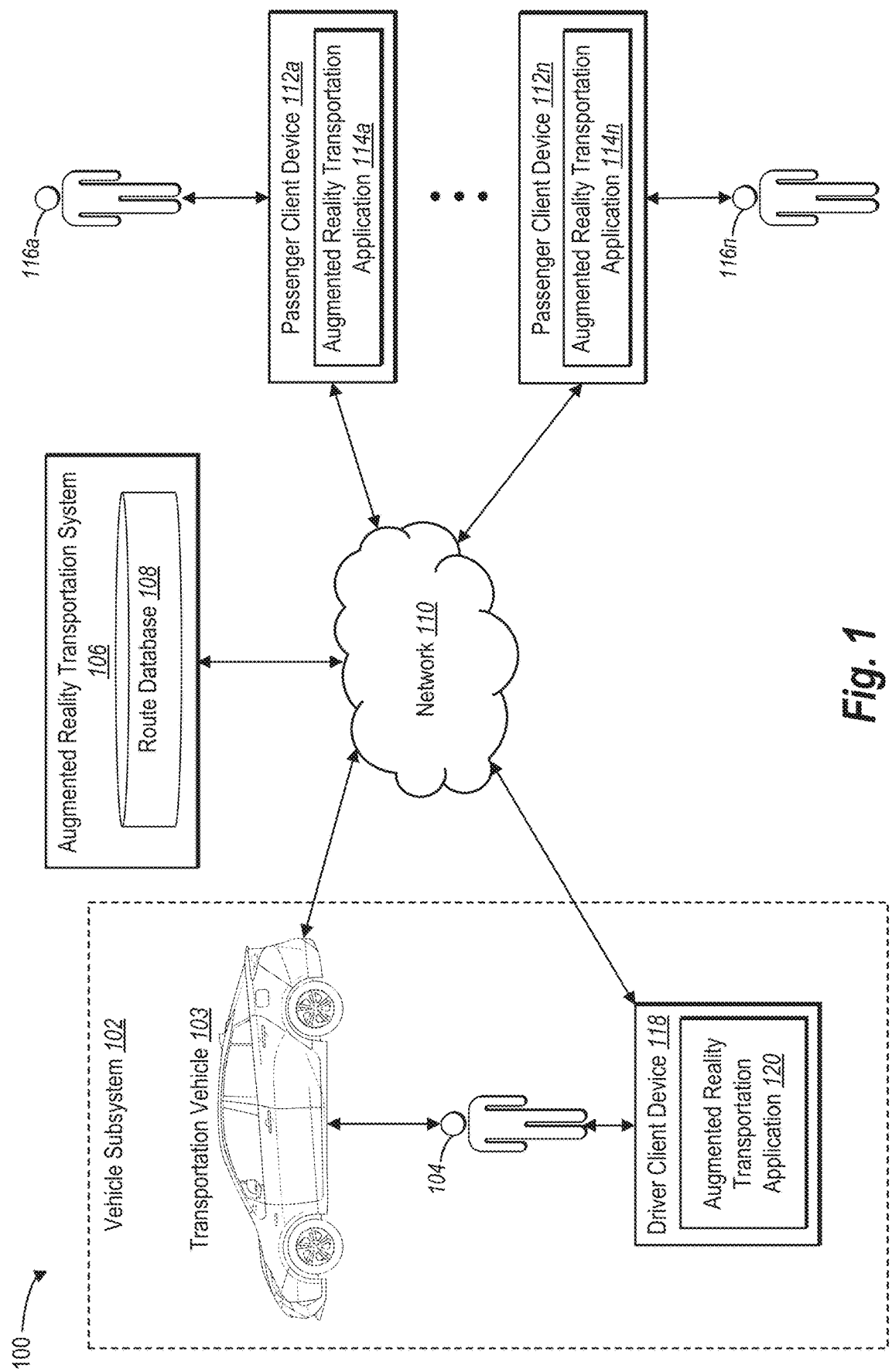
FIG. 1 illustrates a schematic diagram of an example environment of an augmented reality transportation system in accordance with one or more embodiments.

The present detailed description provides one or more embodiments of an augmented reality transportation system (sometimes referred to herein as simply "system") that provides benefits and solves one or more of the foregoing or other problems associated with conventional transportation systems (e.g., transportation networks, rideshare services). As discussed below, the disclosed augmented reality transportation system (or "AR transportation system") leverages historical ride data to identify information relevant to a pickup or drop-off process and the provides one or more AR elements to a passenger or driver to assist in the pickup or drop-off process. For example, the augmented reality transportation system generates and provides AR elements for display as an overlay of a portion of a real-world view (e.g., by way of an augmented reality device) of an area surrounding a passenger (or driver). To illustrate, the augmented reality transportation system can generate AR elements representing one or more of an ideal pickup location, an ideal drop-off location, a driver location, or other transportation-related information displayable by way of an augmented reality device.

As mentioned, the augmented reality transportation system leverages historical ride information (collected from data representing past rides conducted through a rideshare service) and then generates an augmented reality element based on historical information (e.g., associated with an area surrounding a passenger waiting for pickup). To generate the augmented reality element based on historical information, the augmented reality transportation system collects and accumulates the historical information over each ride taken by way of the transportation system. To illustrate, the augmented reality transportation system has a number of transportation vehicles (e.g., cars) all over the world that pick up and transport passengers, delivering them to various destinations across the globe. For each ride taken, the system can identify a requested pickup location, an actual pickup location, a route of a driver to the pickup location, a requested destination, a recommended route to the requested destination, an actual route taken to the destination, driving maneuvers performed during the ride, and a drop-off location for the ride. The system can further identify a time, time of day, a day of week, and/or an elapsed time for each of the above events. In some examples, the system determines location and/or timing information using global positioning system ("GPS") information received from client devices for the driver and the passenger, or otherwise independently obtained by the system. The augmented reality transportation system can further collect traffic information for each ride (e.g., from information collected from drivers or from a third-party source).

By gathering the information for each ride taken, the augmented reality transportation system compiles a historical information database across the entire system, and one that is ever-increasing in size with each new ride. The augmented reality transportation system performs analyses of the historical information (e.g., by way of machine learning models and/or neural networks) to inform future decisions on route recommendations, pickup location assignments, drop-off location assignments, etc., as will be described in further detail below. In using the historical information in this way, the augmented reality transportation system provides highly accurate recommendations and/or predictions for future rides either in situations where a passenger is requesting pickup at a certain location or in situations where a driver is trying to navigate dense city traffic to drop off a passenger at the best possible place for ease of navigation, speed, proximity to a desired destination, or a number of other factors.

In one or more embodiments, the augmented reality transportation system receives a ride request from a passenger. In addition, the augmented reality transportation system receives location information (e.g., GPS coordinates received from a passenger client device) representing the passenger's location, a requested pickup location, and/or a requested destination for a ride being requested by the passenger. The augmented reality transportation system further receives location information from a vehicle (e.g., from a driver's client device and/or a GPS device within a transportation vehicle).

Upon receiving the location information from the passenger client device, the augmented reality transportation system analyzes the historical information for the area surrounding the passenger. That is to say, the augmented reality transportation system accesses historical information that corresponds to the location information (e.g., GPS coordinates) of the passenger as indicated by the passenger client device. Upon accessing the historical information in response to receiving a pickup request from a passenger, the augmented reality transportation device further analyzes the historical information that corresponds to the area surrounding the passenger to identify-based on a number factors, as will be discussed in further detail below—an ideal pickup location for a transportation vehicle (e.g., a transportation vehicle that the augmented reality transportation system assigns or matches to the passenger) to pick up the passenger.

In analyzing the historical information that relates to the area surrounding the passenger, the augmented reality transportation system identifies previous pickup locations (both requested pickup locations and actual pickup locations) for past rides. Additionally, the augmented reality transportation system analyzes historical traffic information within the area surrounding the passenger. By analyzing historical traffic information in addition to other historical information for the area surrounding the passenger, the augmented reality transportation system determines an ideal pickup location based on factors such as an estimated time for the passenger to navigate to the pickup location, an estimated time for the driver to navigate to the pickup location, and/or historical pickup location preferences for passengers within the area.

The augmented reality transportation system may determine an ideal pickup location through any suitable method. For example, in some embodiments, the augmented reality transportation system identifies multiple potential pickup locations and then calculates a score for each potential pickup location. Using the calculated scores, the augmented reality transportation system can then identify one or more preferred pickup locations from the multiple potential pickup locations. Additionally, in at least one example, the augmented reality transportation system provides an option for the passenger to select one of the potential or preferred pickup locations as the ideal pickup location. Alternatively, the augmented reality transportation system determines which of the possible pickup locations is the ideal pickup location, but may also provide an option for the passenger to decline the chosen ideal pickup location, whereupon the augmented reality transportation system selects a different (e.g., the next in line in the ranking or that has the next best/highest score) potential pickup location.

By analyzing the historical information as well as the current information for the area surrounding the passenger, the augmented reality transportation system determines an ideal placement for a pickup location, as mentioned above. Based on the ideal pickup location, the augmented reality transportation system generates, for presentation to the passenger (e.g., by way of an augmented reality device such as MICROSOFT HOLOLENS) an augmented reality element to mark or designate the ideal pickup location. For example, in some embodiments, the augmented reality transportation system determines one or more GPS coordinates and/or one or more dimensions for the augmented reality element to define the placement of the augmented reality element within an augmented reality environment presented by the augmented reality device.

To illustrate, the augmented reality transportation system determines an ideal pickup location and provides GPS coordinates (e.g., coordinates for the center, edges, and/or corners of where to place the ideal pickup location), orientation, and/or dimensions for the ideal pickup location to an augmented reality device to display a three-dimensional virtual object as a marker for the ideal pickup location. The augmented reality device places the three-dimensional virtual object at the determined location (e.g., according to the GPS coordinates and/or dimensions provided) as an overlay within a real-world view as seen by the passenger by way of the augmented reality device. Additional detail regarding generating and providing is described below with reference to the figures.

Additionally, in at least one embodiment, the augmented reality transportation system may generate an augmented reality element for one or more route maneuvers for presentation to the passenger. For instance, the augmented reality transportation system determines a number of maneuvers to provide to the passenger to help the passenger navigate to the ideal pickup location. For example, to guide the passenger to an ideal pickup location that is across the street, the augmented reality transportation system may determine instructions for walking to the ideal pickup location including 1) continue straight for fifty feet, 2) turn right, and 3) cross the street at the crosswalk to arrive at the ideal pickup location.

The augmented reality transportation system, upon determining the maneuvers to guide the passenger to the ideal pickup location, generates an augmented reality element for each maneuver. For example, the augmented reality transportation system provides coordinates and/or dimensions to place arrows or other maneuver markers as an overlay of the real-world view as seen by the passenger by way of the augmented reality device. Continuing the previous example, the augmented reality transportation system generates and provides information for three separate maneuver markers to the augmented reality device: 1) a straight arrow to indicate to the passenger to continue on a straight path, 2) a right-turn arrow to indicate to the passenger to turn right, and 3) another straight arrow overlaid across the crosswalk to indicate to the passenger to cross at the crosswalk to arrive at the ideal pickup location. Additional detail regarding maneuver markers is provided below with reference to FIG. 6.

The augmented reality transportation system, in at least one example, also identifies one or more "no pickup" locations. For example, the augmented reality transportation system analyzes the historical information to determine a number of factors such as: a previous number of pickups at given places, wait times for pickup at given places, places where it is historically congested, places where previous passengers have given poor ratings as a pickup location, places where previous passengers have historically requested not to be picked up, where it is illegal to pick up passengers, illegal to park, too busy to park, unsafe, or is otherwise undesirable as a pickup location. The augmented reality transportation system further generates an augmented reality element to place on a "no pickup" location to overlay within the augmented reality environment for display to the passenger. Additional detail regarding generating and providing undesirable pickup locations, or "no pickup" locations, is provided below with reference to FIGS. 5-6.

Furthermore, the augmented reality transportation system generates and provides an augmented reality element to overlay above the transportation vehicle. For example, the augmented reality transportation system provides coordinates for the transportation vehicle and generates an augmented reality element to overlay above the location of the transportation vehicle to thereby indicate the location of the transportation vehicle within the real-world view of the environment as seen by the passenger by way of the augmented reality device. For example, the driver location marker may be an arrow, a cloud, a star, an exclamation point, or any other shape or indicator that appears to hover above the transportation vehicle within the augmented reality environment. Additional detail regarding the driver location marker and other augmented reality elements is provided below with reference to FIGS. 5-6.

In addition to analyzing historical data to generate an augmented reality element for presentation to the passenger, in at least one embodiment, the augmented reality transportation system also analyzes historical information for an area surrounding the transportation vehicle in response to receiving the location information from the vehicle subsystem (e.g., from the driver's mobile phone or a GPS device within the transportation vehicle). For purposes similar to those for analyzing the historic area surrounding the passenger, the augmented reality transportation system analyzes historical information for the area surrounding the transportation vehicle and/or the driver to determine historically favored pickup locations with the fastest pickup times, easiest route navigation, least amount of traffic, or other considerations.

As also similar to analyzing current information for the area surrounding the passenger, the augmented reality transportation system likewise analyzes current information for the area surrounding the driver and/or the transportation vehicle. Accordingly, the augmented reality transportation system analyzes current traffic information for the area surrounding the transportation vehicle to consider as part of determining the ideal pickup location to meet the passenger. Additional detail regarding the analysis of the current information (e.g., for the area surrounding the transportation vehicle as well as for the area surrounding the passenger) as well as the analysis of the historical information will be provided below with reference to the figures.

From the perspective of the driver of the transportation vehicle, the augmented reality transportation system provides GPS coordinates and/or dimensions of the ideal pickup location to an augmented reality device associated with the driver. For example, the augmented reality transportation system provides coordinates for a sidewalk location within a city that the augmented reality transportation system defines as the ideal pickup location to meet the passenger. Upon providing the coordinates for the ideal pickup location to the augmented reality device, the augmented reality device, in turn, renders a three-dimensional virtual object as an overlay of a real-world view of an environment as seen by the driver by way of the augmented reality device.

In addition to generating an augmented reality element for the ideal pickup location for presentation to the driver by way of an augmented reality device, the augmented reality transportation system also generates augmented reality elements to guide the driver to the ideal pickup location. To illustrate, similar to generating and providing augmented reality elements to the passenger to guide the passenger to the ideal pickup location, as mentioned above, the augmented reality transportation system also generates and provides augmented reality elements to guide the driver to navigate to the ideal pickup location. For instance, the augmented reality transportation system determines a pickup location route (e.g., an ideal pickup location route) that includes a number of maneuvers by which the driver can navigate to the ideal pickup location. The augmented reality transportation system then provides coordinates to an augmented reality device associated with the driver to place, as an overlay within the real-world view of the environment as seen by the driver by way of the augmented reality device, three-dimensional virtual objects to indicate the maneuvers along the pickup location route.

In some examples, as similarly discussed above, the augmented reality transportation system also generates an augmented reality element to overlay above the passenger to indicate the location of the passenger to driver, such that the driver sees the passenger location marker hovering above the passenger within the augmented reality environment presented by way of the augmented reality device.

In at least one embodiment, the augmented reality transportation system analyzes historical information for a travel route in addition or alternatively to analyzing that of the pickup route. In other words, the augmented reality transportation system determines, after the transportation vehicle picks up the passenger, an ideal drop-off location based on the historical information for the area surrounding the transportation vehicle as well as the historical information for the areas along the travel route and the area surrounding the drop-off location.

Much like how the augmented reality transportation system accesses historical information from a historical information database that contains historical route information (e.g., for pickup routes while navigating to pick up a passenger as well as for travel routes while navigating to drop off a passenger), the augmented reality transportation system further accesses historical information for the travel route and the drop-off location-historical information that the augmented reality transportation system gathers over time from each route taken by each driver of each transportation vehicle, as mentioned above. For example, the augmented reality transportation system accesses and analyzes the historical information to identify previous drop-off locations within a certain distance of the desired destination and determines, based on one or more factors, an ideal drop-off location.

The augmented reality transportation system further generates an augmented reality element for the ideal drop-off location. In other words, the augmented reality transportation system provides GPS coordinates and/or dimensions for the ideal drop-off location to an augmented reality device. The augmented reality device renders a three-dimensional virtual object within a real-world view of the environment as seen by the passenger and/or the driver (e.g., by way of the augmented reality device such as MICROSOFT HOLOLENS). By providing the three-dimensional virtual object, the augmented reality transportation system creates an augmented reality environment by which the passenger and/or driver can see the drop-off location marker within the real-world environment as if it were a real, tangible object placed at the ideal drop-off location.

In addition to the augmented reality element for the ideal drop-off location, the augmented reality transportation system also determines a plurality of maneuvers to guide the driver—and to provide an indication to the passenger—along a travel route to the ideal drop-off location. That is to say, much like providing maneuver markers to guide the passenger to the ideal pickup location and to the driver to guide the driver to the ideal pickup location, the augmented reality transportation system also provides maneuver markers for each maneuver along the travel route to deliver the passenger to the ideal drop-off location. Additional detail regarding the maneuver markers for the travel route to guide the driver to the ideal drop-off location is provided below with reference to FIG. 8.

In one or more embodiments, the augmented reality transportation system also analyzes historical data for popular travel destinations (e.g., tourist attractions, landmarks, etc.). For example, the augmented reality transportation system identifies those places at which a larger number (e.g., above a certain threshold) of previous passengers have requested drop-off as popular travel destinations. The augmented reality transportation system also provides coordinates for those identified popular destinations and generates markers (e.g., augmented reality destination elements) for the popular destinations to overlay the markers on top of those destinations (e.g., on a building, on a tourist attraction, on grounds of a park, on a city square, etc.) within the real-world environment as seen by the passenger and/or driver by way of an augmented reality device.

In the same or other embodiments, the augmented reality transportation system enables the passenger and/or the driver to share the augmented reality environment with others. In other words, the augmented reality transportation system provides an option to the passenger to share (e.g., transmit, stream, or otherwise relay) the augmented reality environment that the passenger views by way of the augmented reality environment, including the generated virtual objects for the ideal pickup location, drop-off location, or other features.

To illustrate, in some cases a ride share transportation vehicle will have two or more passengers each waiting for pickup in turn. Thus, the augmented reality transportation system, upon receiving an indication to share the augmented reality environment displayed for the first passenger, may receive a transmission of a recording of the augmented reality environment—i.e., the real-world environment that further includes the overlay of the augmented reality elements mentioned above—as displayed to the first passenger. The augmented reality transportation system transmits a presentation of the augmented reality environment to an augmented reality device associated with the second passenger, whereby the second passenger can view the augmented reality environment of the first passenger.

Accordingly, by enabling passengers and/or drivers to share a presentation of an augmented reality environment with other passengers and/or drivers, the augmented reality transportation creates a greater sense of inclusion within the transportation experience. For example, the augmented reality transportation system helps a second passenger (e.g., a passenger who is second "in line" within a ride share line) understand the progress of the transportation vehicle when the second passenger can see for themselves the current status of picking up passengers. This helps prevent frustration for late pickups that would otherwise be due to unknown causes because passengers can watch the progress of the transportation vehicle to understand what causes any delays on the way for pickup.

Beyond preventing frustration, by providing an option to share the augmented reality experience, the augmented reality transportation system is more inclusive by further allowing passengers to share ride information with each other, to keep each other more informed as to the progress of the morning commute, to warn each other of delays, or even just for fun. In some embodiments, a passenger may even share an augmented reality environment with friends and/or family so that the friends and family can watch the travel progress of a friend or loved one, thereby helping people other than passengers and/or drivers also feel more included.

By providing augmented reality elements such as a pickup location marker, a drop-off location marker, a driver location marker, and/or a passenger location marker within a real-world setting, the augmented reality transportation system provides clearer information than conventional systems. For example, the augmented reality transportation system provides location and path markers within an augmented reality environment for a more detailed, first-person perspective than is provided by conventional systems. A first-person, three-dimensional perspective of the real-world, together with augmented reality elements to convey transportation-related information, more effectively helps passengers understand the context of the augmented reality elements within their surroundings and more clearly indicates locations within a particular setting than do pins placed, for example, on a two-dimensional map.

Additionally, because the augmented reality transportation system analyzes historical information to inform determinations of pickup locations, travel routes, drop-off locations, etc., the augmented reality transportation system further provides more accurate and more helpful route information to passengers as well as drivers. For instance, analyzing the historical information to identify previous pickup locations, drop-off locations, as well as previous routes that were desirable in the past, generally enables the augmented reality transportation system to predict locations and routes that are more desirable than others for future determinations as well. For example, passengers at a sporting event who are historically picked up at the curb in front of the main entrance to the arena indicate a high likelihood that future passengers who request a ride from within the arena will appreciate the same pickup location.

The augmented reality transportation system is also more immersive than conventional systems. For example, the augmented reality transportation system generates and provides augmented reality elements to an augmented reality device. Conventional systems, on the other hand, are generally two-dimensional, and generally provide information in a less integrated way such as, for example, on a map displayed on a mobile device. In contrast, the augmented reality transportation system provides, by way of an augmented reality device, an immersive, three-dimensional real-world environment with an overlay of augmented reality elements to inform the passenger and/or the driver of locations and routes associated with transportation. Thus, a passenger and/or a driver experience of the augmented reality transportation system integrates navigation features into the real-world for a more immersive experience.

In addition, where conventional systems provide location information in two-dimensional map form, the augmented reality transportation system described herein provides three-dimensional augmented reality elements within a view of the real world—i.e., in an augmented reality environment. Thus, the augmented reality transportation system eliminates the need to—sometimes unsafely-manipulate or handle a mobile device for directions while navigating a route. Instead, the augmented reality transportation system provides markers as virtual objects directly within the view of the real-world as seen through an augmented reality device. Accordingly, the augmented reality transportation system provides safer, more detailed, more immersive, more accurate, and more easily understandable information to passengers and drivers alike.

As another advantage, the augmented reality transportation system described herein provides a greater degree of detail and is more informative to a passenger than some conventional systems. For example, the augmented reality transportation system provides augmented reality elements to guide a passenger through a live scene of the real world. By providing step-by-step guidance to passengers, and by providing pickup locations to drivers, the augmented reality transportation system described herein yields more successful pickups and fewer cancelations. Because of producing fewer cancelations, the augmented reality transportation system processes fewer communications (e.g., ride requests, complaints, etc.), and therefore consumes less memory and system processing resources.

More detail regarding the augmented reality transportation system will now be provided with reference to the figures. For example, FIG. 1 illustrates a schematic diagram of an example augmented reality transportation environment 100 for implementing an augmented reality transportation system in accordance with one or more embodiments. An overview of the augmented reality transportation system 106 and the environment 100 is described in relation to FIG. 1. Thereafter, a more detailed description of the components and processes of the augmented reality transportation system 106 is provided in relation to the subsequent figures.

As shown in FIG. 1, the augmented reality transportation environment 100 includes a vehicle subsystem 102. The vehicle subsystem 102 includes a transportation vehicle 103 associated with a driver 104, and further includes a driver client device 118 also associated with the driver 104. The driver client device 118 includes thereon an augmented reality transportation application 120 installed as either software, hardware, or both.

As used herein, a "vehicle subsystem" refers to a number of components within a vehicle system that operates within the augmented reality transportation environment 100. For example, a vehicle subsystem can include, as mentioned above, a transportation vehicle (e.g., transportation vehicle 103), a driver (e.g., driver 104), and/or a driver client device (e.g., driver client device 118.

The vehicle subsystem includes a driver 104, as mentioned above. For example, the term "driver" as used herein refers to an individual person who operates the transportation vehicle 103 to drive the transportation vehicle 103 along various routes to pick up and/or drop off passengers. Alternatively, though not illustrated in FIG. 1, the augmented reality transportation environment 100 may not include a driver 104, but instead the transportation vehicle 103 may be an autonomous vehicle—i.e., a self-driving vehicle that includes computer components and accompanying sensors requisite for driving without manual driver input from a human operator. Further, in some embodiments, a hybrid self-driving vehicle may include both self-driving functionality as well as some human operator interaction with or independent of the self-driving functionality. In other embodiments, the driver 104 may refer to an autonomous driver (e.g., a computer-based navigation and driving system) that acts as part of the transportation vehicle 103. Furthermore, the transportation vehicle 103 can include a device such as, for example, a windshield that is capable of rendering three-dimensional virtual objects or augmented reality elements as an overlay of the view of the real world that the driver 104 and/or passenger (e.g., passenger 116a) sees through the windshield.

Additionally or alternatively, the transportation vehicle 103 within the vehicle subsystem 102 may refer to a vehicle. The transportation vehicle 103 may be a car associated with the augmented reality transportation system 106. In cases where the transportation vehicle is an autonomous vehicle, the transportation vehicle 103 may include additional components not depicted in FIG. 1 such as location components (e.g., a GPS locator), a sensor suite, and/or other components necessary to navigate without a driver (or with minimal interations with a driver).

As mentioned, the vehicle subsystem 102 further includes a driver client device 118 associated with the driver 104. The driver client device 118 may be separate or integral to the vehicle. For example, the driver client device 118 may refer to a separate mobile device such as, for example, a smartphone or tablet associated with the driver 104. Alternatively and/or additionally, the driver client device 118 may be a subcomponent of the vehicle computing system. The driver client device 118 may include various sensors such as a GPS locator, an accelerometer, gyroscope, a magnetometer, and/or other sensors that the augmented reality transportation system 106 can access to obtain information.

A driver client device may also (or additionally) refer to an augmented reality device associated with a driver (e.g., driver 104). For example, the driver client device 118 may include a wearable augmented reality device such as MICROSOFT HOLOLENS, MAGIC LEAP, or other augmented reality device that the driver 104 wears. For example, the driver client device 118 may be capable of rendering three-dimensional augmented reality elements and overlaying the augmented reality elements onto a view of the real world as seen by the driver 104 as the driver 104 looks through the driver client device 118 (e.g., by way of an eyepiece such as goggles, glasses, or other medium that is part of the driver client device 118).

In addition to the vehicle subsystem 102, the augmented reality transportation environment 100 also includes the augmented reality transportation system 106, a network 110, and one or more passenger client devices 112a-112n (referred to herein collectively as "passenger client devices 112"), each associated with passengers 116a-116n (referred to herein collectively as "passengers 116"). As used herein, a passenger (e.g., passenger 116a) refers to an individual or group of individuals who has requested a ride from the augmented reality transportation system 106. A passenger may refer to an individual who has requested a ride but who is still waiting for pickup. A passenger may additionally or alternatively refer to an individual who has already been picked up and who is currently riding within the transportation vehicle 103 on the way to a desired destination (e.g., a destination indicated by the passenger 116a).

Additionally, a passenger client device (e.g., passenger client device 112a) may refer to a mobile device such as, for example a smartphone or tablet associated with a passenger (e.g., passenger 116a). For example, the passenger 116a may interact with the passenger client device 112a by way of the augmented reality transportation application 114a installed thereon to request a transportation ride from the augmented reality transportation system 106. The passenger 116a may further provide input by way of the augmented reality transportation application 114a on the passenger client device 112a to select a particular location (e.g., a place on a nearby sidewalk) for pickup, to indicate a desired destination, and/or to indicate a particular location for drop-off at or near the destination.

A passenger client device may also (or alternatively) refer to an augmented reality device associated with a passenger (e.g., passenger 116a). For example, the passenger client device 112a may include a wearable augmented reality device such as MICROSOFT HOLOLENS, MAGIC LEAP, or other augmented reality device that the passenger 116a wears. For example, the passenger client device 112a may be capable of rendering three-dimensional augmented reality elements and overlaying the augmented reality elements onto a view of the real world as seen by the passenger 116a as the passenger 116a looks through the passenger client device 112a (e.g., by way of an eyepiece such as goggles, glasses, or other medium).

As used herein, the augmented reality transportation application (e.g., augmented reality transportation application 114a or 120) refers to an application in the form of hardware, software, or both installed on the passenger client device 112a or the driver client device 118. In addition, an augmented reality transportation application can include one or more user options that enable a passenger 116a and/or a driver 104 to interact (e.g., select, tap, touch, click, stare, blink, etc.) to provide information, request a transportation ride, accept a request for a ride, and perform other necessary tasks to organize a ride between a passenger 116a and a driver 104.

Furthermore, in some embodiments, the augmented reality transportation application can also include functionality related to augmented reality. For example, the augmented reality transportation application 114a installed on the passenger client device 112a may be able to communicate with the augmented reality transportation system 106 to receive information related to the location of an augmented reality element, and may be able to render the augmented reality element for display to the passenger 116a. For example, the passenger client device 112a, by way of the augmented reality transportation application 114a, may render an augmented reality element and overlay the element on a portion of the view of the real world as if the augmented reality element were part of the real word—i.e., the augmented reality element persists in a given locale within the real-world view without moving places as the passenger 116a moves, turns, etc., as if the augmented reality element were a tangible object physically placed in the real world.

Likewise, the augmented reality transportation application 120 can include similar functionality, but instead for display to the driver 104. For example, the augmented reality transportation application 120 can communicate with the augmented reality transportation application 106 (e.g., by way of the network 110) to receive information regarding the location and/or dimension of an augmented reality element. In turn, the augmented reality transportation application 120 can render and display (e.g., as an overlay) the augmented reality element, for presentation to the driver 104 at a given location (e.g., GPS coordinate), such that the augmented reality element does not move and appears to naturally fit with the real-world environment as displayed to the driver 104 by way of the driver client device 118.

As shown by the augmented reality transportation environment 100 of FIG. 1, the augmented reality transportation system 106 communicates with the vehicle subsystem 102 and/or the passenger client devices 112 by way of the network 110. For example, the network 110 facilitates transmission of data packets to relay information between the augmented reality transportation system 106, the vehicle subsystem 102, and/or the passenger client devices 112. To illustrate, the augmented reality transportation system 106 may access GPS location information or other information from the driver client device 118, the transportation vehicle 103, and/or one or more of the passenger client devices 112.

In addition, the driver client device 118, the transportation vehicle 103, and/or the passenger client devices 112 communicate with the augmented reality transportation system 106 to provide GPS coordinates, traffic information, pickup request information, drop-off request information, etc. to the augmented reality transportation system 106. For example, the passenger client device 112a transmits a GPS coordinate of the passenger 116a upon detecting that the passenger 116a requests a pickup from the augmented reality transportation system 106 or else at different time as a background process while the augmented reality transportation application 120 is running on the passenger client device (e.g., passenger client device 112a). In addition, when the passenger 116a indicates a desired pickup location, a desired destination, and/or a desired drop-off location, the passenger client device 112a also transmits the corresponding information to the augmented reality transportation system 106 via an appropriate communication protocol.

As used herein, a pickup location refers to a location designated as a place to pick up a passenger. For example, a pickup location can refer to a location such as, for example, a specific section of curb along a sidewalk of a street, a particular landmark such as a statue outside a park, or other location appropriate for picking up a passenger for transport. The pickup location may include a GPS coordinate (e.g., latitude and longitude), a map location, a reference to a particular street address, or other location indicator. Additionally, the pickup location may include specific dimensions. To illustrate, the augmented reality transportation system 106 may place a pickup location indicator in the shape of a cube having certain dimensions at a particular latitude and longitude.

Additionally, as used herein, a desired destination refers to an end destination for a travel route (e.g., a drop-off route) within a transportation vehicle. That is to say, a desired destination refers to a place or locale to which the passenger desires to be transported within the transportation vehicle. For example, a desired destination can include, but is not limited to, a restaurant, a place of business, a park, a street address, a tourist attraction, or a landmark.

As also used herein, a drop-off location refers to a specific location where the passenger is to be dropped off. In other words, the drop-off location refers to the actual place where the augmented reality transportation system 106 designates for dropping off the passenger at the end of a travel route. Whereas the desired destination refers to the end locale that the passenger desires to visit, the drop-off location, on the other hand, refers to a more specific portion of sidewalk, grass, or other area to which the transportation vehicle will travel to drop off the passenger. Generally, the drop-off location is near to the desired destination such as, for example, a section of curb in front of a restaurant that the passenger 116a designates as the desired destination. The drop-off location may include a GPS coordinate or a map location, and may further include set dimensions (e.g., set by the augmented reality transportation system 106). To illustrate, the augmented reality transportation system 106 may designate (e.g., mark) the drop-off location with a 6-foot-by-6-foot-by-6-foot cube placed at a specific latitude and longitude.

As illustrated in FIG. 1, the augmented reality transportation system 106 communicates with the vehicle subsystem 102 and the passenger client devices 112 to build a database of historical information. For example, the augmented reality transportation system 106 stores the historical information gathered from the vehicle subsystem 102 and the passenger client devices 112 within route database 108. In some embodiments, the augmented reality transportation system 106 communicates with a third party mapping or sensory information provider. In these embodiments, the augmented reality transportation system 106 receives historical information from the third party.

To illustrate, the augmented reality transportation system 106 maintains constant records of each ride associated with the vehicle subsystem 102 (and all other vehicle subsystems associated therewith)—i.e., associated with each ride request received from a passenger (e.g., passenger 116a), with each passenger that the transportation vehicle 103 picks up, and with each passenger that the transportation vehicle drops off. For example, the augmented reality transportation system 106 maintains information within the route database 108 by compartmentalizing various data as associated with a particular passenger (e.g., passenger 116a), with a particular vehicle subsystem (e.g., vehicle subsystem 102), and/or with a particular route (e.g., a particular pickup route and/or drop-off route). To illustrate, the augmented reality transportation system 106 records each passenger location, driver location, pickup route, drop-off route, the time of day and duration for navigating each route for the driver 104 as well as the passenger 116a, and other information associated with each ride request that the augmented reality transportation system 106 receives from a passenger. The augmented reality transportation system 106 keeps records of each route associated with each transportation vehicle within each vehicle subsystem associated with the augmented reality transportation system 106. Accordingly, the augmented reality transportation system 106 maintains historical information across all vehicle subsystems and all passengers (e.g., passengers 116) associated with the augmented reality transportation system 106 within the route database 108.

As used herein, a pickup route refers to a route or path that an individual or group of individuals can navigate toward a pickup location. For instance, a pickup route can include a series of maneuvers including, but not necessarily limited to, continuing straight for a certain specified distance, turning right or left, merging, stopping, yielding, crossing the street, etc. For example, a pickup route can include a passenger pickup route that a passenger (e.g., passenger 116a) navigates to the pickup location, and a pickup route can additionally or alternatively include a driver pickup route that a driver (e.g., driver 104) navigates (e.g., within transportation vehicle 103) to arrive at the pickup location to meet the passenger 116a. In addition, the augmented reality transportation system 106 can analyze historical information associated with the area around the passenger location and/or the area around the driver location, and, based on that analysis, can determine a pickup route (e.g., an ideal passenger pickup route and/or an ideal driver pickup route) to guide the passenger 116a and/or the driver 104 to the pickup location.

As also used herein, a drop-off route, or a travel route, refers to a path or route that a driver (e.g., driver 104) and/or passenger (e.g., passenger 116*a*) navigate (e.g., within transportation vehicle 103) to arrive at a drop-off location. For example, a drop-off route, like a pickup route, can include a number of maneuvers throughout the route such as, for example, continuing straight, turning, stopping, yielding, merging, etc. For example, the augmented reality transportation system 106 can determine a drop-off route by analyzing historical information associated with the areas around the driver location and/or the passenger location and can further provide the drop-off route to the driver client device 118 and/or the passenger client device 112*a* to guide the driver 104 and/or the passenger 116*a*.

As mentioned, FIG. 1 illustrates an augmented reality transportation environment 100 wherein the augmented reality transportation system 106 communicates with passenger client device 112 and the vehicle subsystem 102 to organize and facilitate rides for passengers 116. For example, in some cases, the augmented reality transportation system organizes a ride share where more than one passenger (e.g., passenger 116*a* and passenger 116*b*) each request pickup from the augmented reality transportation system 106, whereupon the augmented reality transportation system 106 matches the passenger to vehicle subsystem 102. The augmented reality transportation system 106 then schedules pickup for the passenger 116*a* and the passenger 116*b*, one after the other, to send the transportation vehicle 103 to pick each passenger up in turn, and further to drop each passenger off in turn at respective drop-off locations at or near desired destinations indicated by each passenger.

Furthermore, the augmented reality transportation system 106 communicates (e.g., by way of network 110) with the vehicle subsystem 102 and the passenger client devices 112 to provide one or more augmented reality elements. To illustrate, the augmented reality transportation system 106 provides GPS coordinates, dimensions, and/or other necessary information to the driver client device 118 to enable the driver client device 118 to render a three-dimensional augmented reality element at a given location defined by the GPS coordinates and of a given size and shape as defined by the dimensions. For example, when the augmented reality transportation system 106 receives a ride request from passenger 116*a*, the augmented reality transportation system 106 assigns the vehicle subsystem 102 to pick up and transport the passenger 116*a*, then identifies a location of the passenger 116*a* (e.g., by receiving GPS information from the passenger client device 112*a*), analyzes the historical information associated with the location of the passenger 116*a* and/or the location of the driver 104, and further provides the requisite information to the passenger client device 112*a* to render an augmented reality element within a view of the real world to display to the passenger 116*a* by way of the passenger client device 112*a*.

As used herein, an augmented reality element may refer to a virtual, computer-generated object to overlay on a view of the real-world—i.e., to augment the real world. An augmented reality element may include a computer-generated box or other object to overlay within a passenger's view or a driver's view of the real world (e.g., as seen through a passenger client device 112*a* or driver client device 118). For instance, an augmented reality element may have various attributes such as a shape, a color, a height, a width, a depth, and a location or placement within the view of the real world. Various attributes may indicate differences between augmented reality elements. For example, an augmented reality element that is larger, smaller, or that has a different color than other elements may indicate an ideal pickup location, or else may indicate a location that is undesirable for pickup. Generally, the augmented reality transportation system 106 places an augmented reality element within the view of the real world so that the augmented reality element appears to sit or rest at a particular location in the real world. As an example, an augmented reality element may appear to rest on a portion of sidewalk, and may maintain a persistent perspective such that, when the viewing angle or position changes (e.g., when the passenger 116*a* or driver 104 turn their head or move positions), the augmented reality element not only remains in place on the sidewalk but also changes angles commensurate with changes in the viewing angle or position.

Alternatively, the augmented reality transportation system 106 generates the augmented reality element and provides the generated augmented reality element by way of the network 110 to the passenger client device 112*a* and/or the driver client device 118. For example, the augmented reality transportation system 106 receives GPS information from the passenger client device 112*a* and further analyzes the historical information associated with the location of the passenger 116*a* to determine an ideal placement for an augmented reality element. The augmented reality transportation system 106 locates the ideal place to mark the pickup location, and then the augmented reality transportation system 106 further generates the augmented reality element and provides the element to the passenger client device 112*a* and/or the driver client device 118 to display as part of an augmented reality environment. Additional detail regarding generating and providing augmented reality elements to mark a pickup location, drop-off location, no pickup location, no drop-off location, or other desired features within an augmented reality environment is provided below with reference to FIGS. 5-8.

As used herein, an augmented reality environment refers to an amalgam of real-world settings and virtual objects. That is to say, an augmented reality environment refers to a representation of a real-world environment that also includes an overlay of augmented reality elements (e.g., three-dimensional virtual, computer-generated objects) such as, for example, a pickup location marker, a drop-off location marker, or other object. Generally, the overlay of augmented reality elements within an augmented reality environment is seamless—i.e., the augmented reality elements overlaid on the real-world view appear to a user (e.g., driver 104 or passenger 116*a*) to fit in naturally with the surrounding real-world environment wherever they are placed.

As illustrated in FIG. 1, the augmented reality transportation system 106, the vehicle subsystem 102, and the passenger client devices 112 may directly communicate with each other, bypassing network 110. For example, the augmented reality transportation system 106 may communicate directly with the vehicle subsystem 102, or indirectly via network 110, to receive location information and other driver-related information as mentioned above and described in further detail below. Furthermore, the augmented reality transportation system 106 may communicate directly with passenger client devices 112, or indirectly via network 110, to receive passenger location information, route destination information, or other passenger related information, as mentioned above and described in further detail below.

Although FIG. 1 illustrates the augmented reality transportation system 106 as separate and distinct from the passenger client devices 112 and the vehicle subsystem 102, in some embodiments, the augmented reality transportation system 106 may include one or more of the passenger client devices 112 and may additionally or alternatively include all or part of the vehicle subsystem 102. For example, the augmented reality transportation system 106 may include the driver client device 118 or else may include the transportation vehicle 103, or may include both the driver client device 118 and the transportation vehicle 103.

Furthermore, though not depicted in FIG. 1, the transportation vehicle 103 may include a transportation service device (e.g., an AMP) therein to act as an identifier of the transportation vehicle 103. For example, the augmented reality transportation system 106 can indicate to the transportation device of transportation vehicle 103 to display a particular color (e.g., pink, blue, green, red, etc.) and may also indicate to the passenger 116a by way of the passenger client device 112a that the transportation vehicle 103 whose transportation device is currently displaying the particular color is the transportation vehicle 103 to which the passenger 116a has been assigned for a given ride.

As will be described in further detail below with reference to FIGS. 2-8, the components of the augmented reality transportation environment 100 or the augmented reality transportation system 106 can collect historical data, manage a ride share system, arrange pickup and drop-off for a passenger by a transportation vehicle, and provide an augmented reality environment to a passenger and/or a driver to relay route-related information in a three-dimensional, immersive setting.

Although much of the discussion provided herein is primarily directed to creating and providing augmented reality elements within an augmented reality environment, it will be understood based on this disclosure that the augmented reality transportation system 106 accesses previously-created historical data related to various routes navigated by passengers and drivers alike. For example, in these or other embodiments, the augmented reality transportation system 106 collects (e.g., gathers) historical information related to previous route requests received from previous passengers, previous pickup locations for previous passenger, previous drop-off locations, previous durations of pickup routes, drop-off routes, etc. The augmented reality transportation system 106 may also analyze the historical information by way of location scoring algorithms or a neural network (e.g., a convolutional neural network) to determine relationships between various data within the information such as when and in how large a surrounding area of a particular pickup location is especially ideal.

Figure 2:
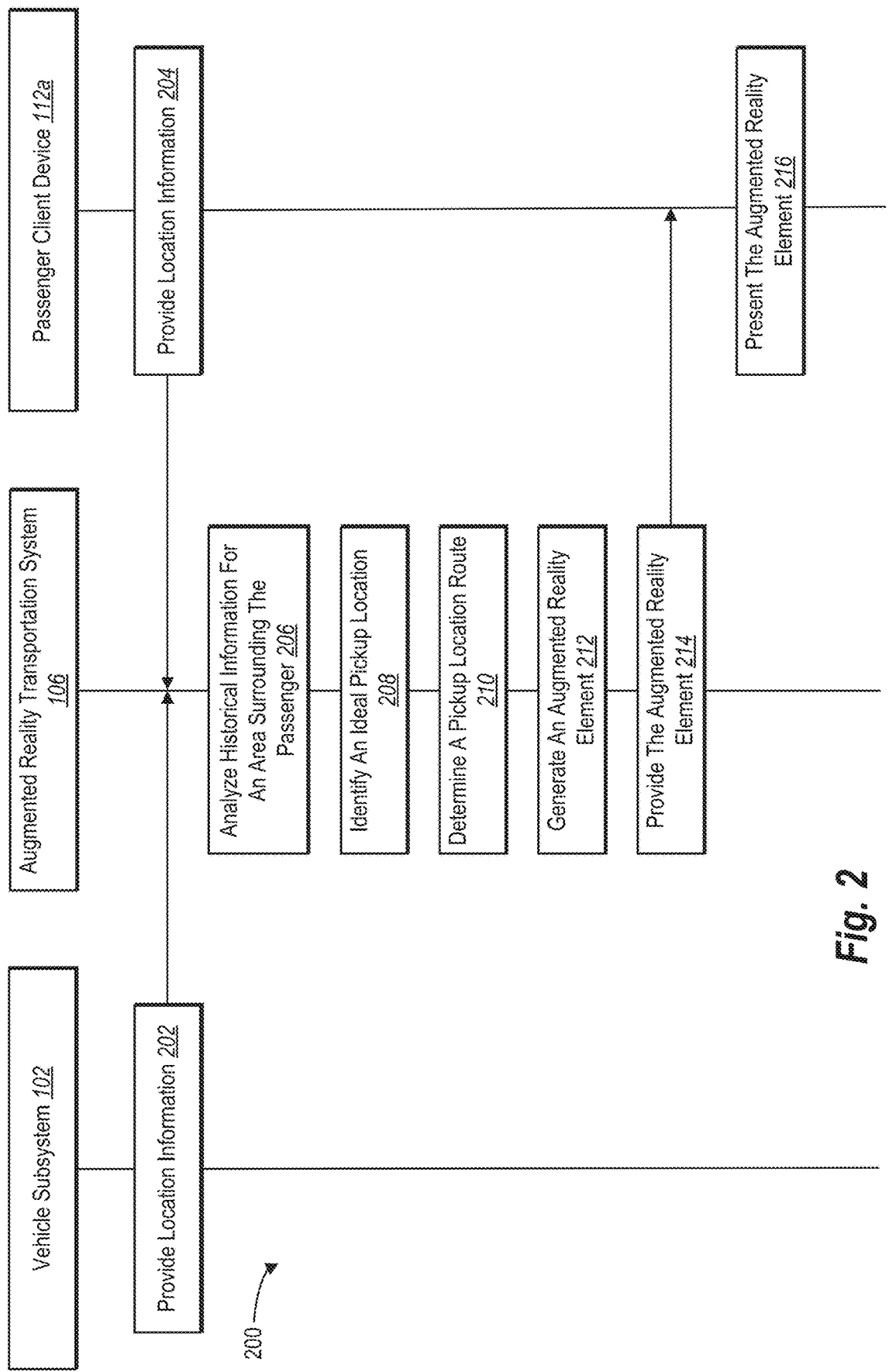
FIG. 2 illustrates a sequence diagram for presenting an augmented reality pickup element in accordance with one or more embodiments.

FIG. 2 illustrates a sequence 200 of a series of acts performed by the vehicle subsystem 102, the augmented reality transportation system 106, and/or the passenger client device 112a. While FIG. 2 illustrates a single passenger client device 112a, it will be understood from this disclosure that additional or alternative passenger client devices 112 may also perform the acts described in relation to FIG. 2. Furthermore, while FIG. 2 illustrates a particular order or sequence for the acts depicted therein, the acts may be performed in an alternative order and may further include additional or alternative acts as well.

As illustrated by sequence 200 of FIG. 2, the vehicle subsystem provides location information to the augmented reality transportation system 106, as depicted by act 202. Initially, the augmented reality transportation system 106 receives a request for a transportation ride from a passenger 116a by way of passenger client device 112a. To organize the transportation ride, the augmented reality transportation system 106 identifies and assigns the vehicle subsystem 102 as a match to pick up and transport the passenger 116a. Upon the augmented reality transportation system 106 assigning the vehicle subsystem 102 to pick up the passenger 116a, the vehicle subsystem 102 communicates with the augmented reality transportation system 106 by way of network 110 to provide a GPS coordinate location of the vehicle subsystem 102. In some examples, the vehicle subsystem 102 provides a street address or other form of location information to the augmented reality transportation system 106.

To provide the location information of act 202 to the augmented reality transportation system 106, in some embodiments, the transportation vehicle 103 (e.g., as part of the vehicle subsystem 102) relays a GPS coordinate by way of a GPS locator device within the transportation vehicle 103. In these embodiments, the transportation vehicle 103 continuously provides a latitude and longitude of the location of the transportation vehicle 103 so that the augmented reality transportation system 106 can constantly monitor the changing location of the transportation vehicle 103. For example, when the transportation vehicle 103 is moving (e.g., as the driver 104 drives) throughout a city such as to pick up a passenger 116a, the augmented reality system 106 receives periodic updates (e.g., every half second, every second, etc.) to the GPS location of the transportation vehicle 103 to monitor changes in location as a tracking mechanism.

In other embodiments, the driver client device 118 provides the location information to the augmented reality system 106. For example, the driver client device 118, as part of the vehicle subsystem 102, provides GPS coordinates (e.g., latitude and longitude), a street address, or other form of location information to the augmented reality transportation system 106. To illustrate, in these embodiments, the driver client device 118 includes a GPS device thereon that provides GPS location information that the driver client device 118 can then relay to the augmented reality transportation system 106 by way of network 110.

In addition to location information, the vehicle subsystem 102 may further provide information relating to speed, direction of travel, total distance traveled, total time spent traveling, and other information relating to the vehicle subsystem 102. For example, the transportation vehicle 103 and/or the driver client device 118 of the vehicle subsystem 102 may include, in addition to a GPS device, an accelerometer, a gyroscope, a magnetometer, and/or other sensor capable of capturing various information. For example, the driver client device 118 includes an accelerometer by which the driver client device 118 determines a speed and direction of the driver client device 118 (e.g., within a pocket on the person of the driver 104). In other examples, the transportation vehicle 103 includes an accelerometer by which an on-board computing device can determine a speed and direction of the transportation vehicle 103. In any case, in these or other embodiments, the vehicle subsystem 102 provides information such as speed, direction, distance traveled, and travel time to the augmented reality transportation system 106.

As also illustrated in FIG. 2, the passenger client device 112a provides location information to the augmented reality transportation system 106, as illustrated by act 204. Similar to how the vehicle subsystem 102 provides location information to the augmented reality transportation system 106, the passenger client device 112a also includes a GPS locator device, an accelerometer, a gyroscope, a magnetometer, and/or other sensory devices by which the passenger client device 112a determines a location (e.g., GPS coordinates), speed of travel, direction of travel, etc., of the passenger 116a. In turn, the passenger client device 112a relays the location information and other sensory information to the augmented reality transportation system 106 (e.g., by way of network 110), as depicted by act 204 of FIG. 2.

In response to receiving the location information (and any additional sensory information) from the vehicle subsystem 102 and/or the passenger client device 112a, the augmented reality transportation system 106 analyzes the historical information for the area surrounding the passenger, as shown by act 206 of FIG. 2. For example, the augmented reality transportation system 106 identifies the location of the passenger 116a and further determines an area around the passenger 116a such as, for example, an area within a given number of city blocks of the location of the passenger 116a, an area within a given radius of the passenger 116a, etc., to be an area surrounding the passenger 116a. Accordingly, the augmented reality transportation system 106 analyzes the historical information for the determined area around the passenger 116a.

For example, the augmented reality transportation system 106 accesses the historical information stored within the route database 108 that corresponds to the area around the passenger 116a. To illustrate, the augmented reality transportation system 106 accesses information relating to each previous passenger that has requested a transport ride from within the determined area around the passenger 116a in the past. For example, the augmented reality transportation system 106 identifies a GPS coordinate of each previous passenger at the time each passenger submits a ride request. The augmented reality transportation system 106 further identifies a location (e.g., a GPS coordinate) of an actual pickup location as well as a distance and/or time that each previous passenger traveled between the location of the ride request and each respective pickup location (e.g., the location at which each respective previous passenger actually met with a transportation vehicle).

In addition to accessing information for passenger metrics such as passenger location and passenger travel time, the augmented reality transportation system 106 also accesses information relating to driver metrics. For example, the augmented reality transportation system 106 identifies driver locations for previous drivers at the time each previous ride request was received. The augmented reality transportation system 106 further identifies a distance and/or time that each previous driver traveled while navigating to meet a previous passenger at a pickup location in the past. The augmented reality transportation system 106 accesses the driver-related historical information for previous drivers associated with previous passengers who submitted ride requests from within the determined area around the passenger 116a.

While the augmented reality transportation system 106 accesses historical information for an area around the passenger 116a, as described above, accessing the information for the area around the passenger 116a generally refers to accessing information relating to previous passengers who submitted ride requests from within the area around the passenger in the past, in addition to previous drivers that correspond to each previous passenger. The augmented reality transportation system 106 may also access historical information for areas outside the determined area around the passenger 116a. For example, the augmented reality transportation system 106 accesses information relating to previous pickup locations where the passenger who requested the corresponding pickup submitted such request from within the area around the passenger 116a, but where the actual pickup location was outside the area around the passenger 116a. That is to say, the augmented reality transportation system 106 accesses information for areas outside the determined area around the passenger 116a when, for example, previous passengers who started within the determined area had to walk or otherwise navigate to an area outside the determined area around the passenger 116a to meet a transportation vehicle 103 at a pickup location. In other words, the augmented reality transportation system 106 accesses historical information based on the location of the passenger at the time that the augmented reality transportation system 106 receives a ride request.

Additionally, the augmented reality transportation system 106 accesses other historical information such as previous travel speeds, previous travel distances, etc., for previous drivers navigating to pick up previous passengers within the area around the passenger 116a, as well as for previous passengers navigating within the determined area around the passenger 116a. The augmented reality transportation system 106 accesses additional or alternative information such as, for example, historical request rates for a particular area around the passenger 116a as well as historical driver availability within the area. By analyzing this and other historical information, the augmented reality transportation system 106 can compare previous routes against each other, can calculate average distances, times, etc., for a number of previous routes (e.g., driver pickup routes and passenger pickup routes).

The augmented reality transportation system 106 further accesses information relating to historical traffic patterns, previous indications of passenger preference for pickup locations, historical information relating to previous driver preferences for locations to pick up passengers, previous durations of navigating from various points within the determined area, etc. For example, the augmented reality transportation system 106 accesses historical information that will inform a prediction or determination of an ideal placement for a pickup location (e.g., an ideal pickup location) for the passenger 116a upon receiving a ride request from passenger 116a. Other information that the augmented reality transportation system 106 accesses from within the historical information can include, but is not limited to, a number of roads that each previous passenger and/or previous driver had to cross to navigate to each previous pickup location and a number of turns (or other maneuvers) that a previous passenger and/or a previous driver had to perform to navigate to a previous pickup location.

As used herein, an ideal pickup location refers to a pickup location (e.g., as defined above) where the augmented reality transportation system 106, driver 104, and/or passenger 116a determines as the ideal placement for a pickup location. For example, as will be described in further detail below, the augmented reality transportation system 106 may determine more than one possible pickup locations, and may rank each of the possible pickup locations according to various factors to determine which of the possible pickup locations is the ideal pickup location. Additionally or alternatively, the augmented reality transportation system 106 may provide a given number of possible pickup locations to the passenger 116a (e.g., by way of passenger client device 112a), whereupon the passenger 116a may select a preferred pickup location from among those pickup locations provide. The augmented reality transportation system 106 may then assign the selected pickup location as the ideal pickup location.

The augmented reality transportation system 106 can still further access historical information related to other factors such as historical weather information, historical navigation for previous pickup location routes for a given time of year (e.g., from both the perspective of previous passengers as well as from the perspective of previous drivers), and/or historical information relating to previous pickup location routes for a given time of day.

Upon accessing the historical information, the augmented reality transportation system 106 also analyzes the historical information for the area around the passenger 116a, as depicted by act 206 of FIG. 2. For instance, the augmented reality transportation system 106 utilizes a neural network or other analytical device or model to extrapolate conclusions from the historical data. For example, the augmented reality transportation system 106 trains a machine learning model to analyze the location at which previous pickup location requests took place and compare those historical locations to the locations where actual pickup occurred for each of the respective pickup requests, in addition to analyzing the other historical information relative to each previous passenger and each previous driver, such as navigation distance, navigation time, number of maneuvers, etc., as described above. By training a machine learning model and analyzing previous requests, previous pickup locations, along with other historical information, the augmented reality transportation system 106 determines relationships between where requests take place, where pickup occurs, which pickup locations are preferable for speed (e.g., which are fastest), which pickup locations are preferable for time (e.g., which are least time-intensive), which pickup locations are preferable for distance (e.g., which pickup location routes are shortest), etc.

In some embodiments, the augmented reality transportation system 106 additionally or alternatively uses location scoring algorithms, estimated time of arrival ("ETA") algorithms, or other algorithms to determine ideal pickup and/or drop-off locations. For example, the augmented reality transportation system 106 scores various locations based on factors such as passenger ratings, passenger waiting time, proximity to the passenger, etc., to score pickup and/or drop-off locations. The augmented reality transportation system 106 may weight each factor differently based on an importance of each given factor. For example, the augmented reality transportation system 106 may weight each factor based on passenger input indicating passenger preferences for each factor and/or based on historical information relating to previous passenger preferences. In any case, the augmented reality transportation system 106 may score each possible pickup location to identify an ideal pickup location with the highest score. Likewise, the augmented reality transportation system 106 may score drop-off locations in a similar way.

Furthermore, the augmented reality transportation system 106 analyzes the historical information to determine correlations between weather, time of day, and navigation information relating to a previous pickup location route for each previous passenger and previous driver. Accordingly, the augmented reality transportation system 106 trains a model to predict ideal pickup locations for future passengers such as, for example, passenger 116a in the ongoing example. For example, an ideal pickup location on a winter night when it is snowing and dark outside may mean that the augmented reality transportation system 106 determines that an ideal pickup location should be closer in proximity to the current location of the passenger 116a since historically it is easier for transportation vehicles to navigate nighttime winter roads more quickly than it is for passengers to do so.

Though not illustrated in FIG. 2, the augmented reality transportation system 106 accesses current information in addition to historical information. For example, the augmented reality transportation system 106 accesses current traffic information for the area around the current location of the passenger 116a and also accesses current traffic information for the area around the current location of the vehicle subsystem 102. Additionally, the augmented reality transportation system 106 may also access current weather information, current traffic laws, as well as current placement of fire hydrants and other municipal utilities.

As mentioned, and as illustrated in FIG. 2, the augmented reality transportation system 106 identifies an ideal pickup location for the passenger 116a to meet the vehicle subsystem 102, as depicted by act 208. For example, the augmented reality transportation system 106 utilizes the analysis of the historical information and/or the analysis of the current information to determine an ideal placement for a pickup location (e.g., a location that is optimal based on one or more factors). Accordingly, in some embodiments, the augmented reality transportation system 106 considers one or more factors in identifying an ideal pickup location, where each factor is based on the analysis of the historical information and/or the current information. The one or more factors can include, but are not necessarily limited to, a distance between the passenger 116a and a pickup location, a distance between the transportation vehicle 103 and the pickup location, an estimated time for the passenger 116a to navigate to the pickup location, an estimated time for the driver 104 to drive the transportation vehicle 103 to the pickup location, a number of maneuvers required for the passenger 116a to navigate to the pickup location, a number of maneuvers required for the driver 104 to navigate to the pickup location, an estimated difficulty of stopping the transportation vehicle 103 to pick up the passenger 116a, a congestion level of pedestrian and/or vehicle traffic around the pickup location, and/or the legality of parking or stopping the transportation vehicle 103 at the pickup location.

To give a few examples, the augmented reality transportation system 106 determines an ideal pickup location by determining a particular location where the passenger 116a and the transportation vehicle 103 will predictably arrive at approximately the same time, based on the historical information, as described. As another example, the augmented reality transportation system 106 determines an ideal pickup location to be a location where a certain number of previous passengers have been picked up (e.g., above a threshold number of previous passengers). Alternatively, the augmented reality transportation system 106 determines an ideal pickup location based on a location that is equidistant between the passenger 116a and the transportation vehicle 103. Alternatively still, the augmented reality transportation system 106 determines an ideal pickup location based on a location that is historically the least traffic-congested.

In one or more embodiments, the augmented reality transportation system 106 identifies more than one pickup location as possible pickup locations. For example, the augmented reality transportation system 106 may identify more than one possible pickup location because, in some cases, a different pickup location is ideal for each factor. That is to say, the location that is historically the least traffic-congested is not necessarily in the same place as the location that has historically been indicated to be a passenger preference within the area. To elaborate, the augmented reality transportation system 106 may identify the same number of possible pickup locations as factors that the augmented reality transportation system 106 considers to identify possible pickup locations in the first place.

The augmented reality transportation system 106 may also identify a possible pickup location at each previous pickup location within the area around the passenger 116*a*, as the augmented reality transportation system 106 identifies within the historical information. Additionally or alternatively, the augmented reality transportation system 106 may identify a possible pickup location at a location provided by the passenger 116*a* (e.g., a preferred or requested pickup location) by way of the passenger client device 112*a* or by the driver 104 by way of the driver client device 118.

As can be imagined, in some cases, the augmented reality transportation system 106 identifies two or more possible pickup locations that are in substantially the same place (e.g., they have GPS coordinates or street addresses that are within a threshold distance of each other). When the augmented reality transportation system 106 determines that two or more possible pickup locations have negligible differences in GPS coordinates, street address, or other location information, the augmented reality transportation system 106, in some embodiments, identifies both locations as possible pickup locations. In other embodiments, the augmented reality transportation system 106 does not identify an identical or nearly-identical location as a possible pickup location.

In a similar sense, in some cases, the augmented reality transportation system 106 determines that multiple possible pickup locations have negligible differences in estimated/predicted pickup location route travel time (e.g., for the passenger 116*a*, the driver 104, or both), estimated/predicted pickup location route travel distance (e.g., for the passenger 116*a*, the driver 104, or both), predicted speed of navigation to the pickup location for the driver 104 and/or the passenger 116*a*, convenience (e.g., for the passenger 116*a*, the driver 104, or both), historical user-indicated preference (e.g., as indicated by previous passengers, previous drivers, or both), or other factors described above.

In the same or other embodiments, the augmented reality transportation system 106 assigns a similarity threshold to each factor of each possible pickup location. To illustrate, in some cases, the augmented reality transportation system 106 may identify two or more possible pickup locations that have very similar attributes based on the factors mentioned above. For example, the augmented reality transportation system 106 may identify two possible pickup locations that each have identical or nearly identical levels of traffic, estimated travel times, etc. The augmented reality transportation system 106 therefore assigns a similarity threshold as a mechanism to determine whether two or more different possible pickup locations are different enough to identify each as distinct possible pickup locations. For example, the augmented reality transportation system 106 may assign a threshold to each of the various attributes to determine whether two possible pickup locations are within a certain degree of similarity to each other, at least with respect to a given factor. Although in some embodiments the augmented reality transportation system 106 does not identify a possible pickup location that is within a threshold similarity of another possible pickup location with respect to one or more of the above-mentioned factors, in other embodiments the augmented reality transportation system 106 identifies each possible pickup location, regardless of a similarity of each.

In these or other embodiments, the augmented reality transportation system 106 ranks each possible pickup location based on the factors described above. For example, the augmented reality transportation system 106 determines which of the possible pickup locations is the most ideal, which is the least ideal, and everything in between, and prioritizes the possible pickup locations accordingly. The augmented reality transportation system 106 may rank the possible pickup locations to reduce the total number of possible pickup locations down to a particular number (e.g., 3, 5, 10, etc.), by removing those possible pickup locations whose ranking is below the particular number. For example, the augmented reality transportation system 106 may take the top 3 ranked possible pickup locations and remove the remaining possible pickup locations from consideration.

To rank the possible pickup locations, the augmented reality transportation system 106 may further weight each factor as part of the consideration for ranking. In other words, the augmented reality transportation system 106 assigns a relative value to each of the factors that the augmented reality transportation system 106 utilizes when ranking the possible pickup locations. In some embodiments, one factor may have a higher (e.g., greater, heavier, etc.) weight than another factor. For example, the augmented reality transportation system 106 may assign a greater weight to passenger travel time than to all other factors. As a result, the augmented reality transportation system 106 may identify a possible pickup location that has the shortest travel time for the passenger to navigate to that particular possible pickup location as the ideal pickup location. As can be appreciated, in another example, the augmented reality transportation system 106 may assign each factor its own weight. In yet other examples, the passenger 116*a* and/or the driver 104 may assign weights to one or more factors (e.g., by way of the passenger client device 112*a* and the driver client device 118, respectively).

Based on the identification of possible pickup locations, the weighting of the factors, and the ranking of the possible pickup locations, the augmented reality transportation system 106 identifies an ideal pickup location as the pickup location where the passenger 116*a* will meet the transportation vehicle 103. To identify the ideal pickup location, in some embodiments, the augmented reality transportation system 106 provides each possible pickup location to the passenger 116*a* (e.g., within a list by way of the passenger client device 112*a*). The passenger 116*a* chooses (e.g., selects) one of the possible pickup locations as the ideal pickup location, whereupon the augmented reality transportation system 106 provides the ideal pickup location to the driver 104 by way of the driver client device 118.

Alternatively, the augmented reality transportation system 106 provides, for example, a select number of possible pickup locations to the passenger 116*a*. For example, the augmented reality transportation system 106 may identify a top three or top five ranked possible pickup locations and then provide those select possible pickup locations to the passenger client device 112*a* for the passenger 116*a* to choose the ideal pickup location. Additionally or alternatively, the augmented reality transportation system 106 may provide possible pickup locations (e.g., top ranked possible pickup locations) to the driver client device 118 for the driver 104 to provide input (e.g., driver preference) for the ideal pickup location.

In other embodiments, the augmented reality transportation system 106 may determine which of the possible pickup locations is the ideal pickup location based on the ranking described above. In these or other embodiments, the augmented reality transportation system 106 identifies a pickup location from among the possible pickup locations that has historically been chosen most frequently by previous passengers.

Though not illustrated in FIG. 2, in some embodiments, the augmented reality transportation system 106 also analyzes the historical information for the area surrounding the vehicle subsystem 102 (e.g., the transportation vehicle 103 and/or the driver 104). Similar to analyzing the historical information for the area around the passenger 116a, the augmented reality transportation system 106 also determines an area around the vehicle subsystem 102 (e.g., around the transportation vehicle 103). For example, the augmented reality transportation system 106 determines an area of city blocks, an area within a radius around the transportation vehicle 103, or another area.

The augmented reality transportation system 106 analyzes historical information such as historical traffic information, historical driver preferences (e.g., previous driver preferences for pickup locations, drop-off locations, etc.), historical travel times for previous drivers to navigate to various pickup locations, etc., for drivers who were previously located within the area around the vehicle subsystem 102 assigned/matched to pick up the passenger 116a. Each of the above-discussed items of historical information as well as each of the above-discussed analyses that the augmented reality transportation system 106 performs with respect to the historical information corresponding to the area around the passenger 116a also applies to the historical information for the area around the vehicle subsystem 102.

The sequence 200 of FIG. 2 includes act 210, which depicts that the augmented reality transportation system 106 determines a pickup location route in response to identifying an ideal pickup location according to the processes and methods described above. For example, the augmented reality transportation system 106 calculates a passenger pickup location route to guide the passenger 116a to the ideal pickup location, and further identifies a driver pickup location route to guide the driver 104 to the ideal pickup location.

As mentioned, the augmented reality transportation system 106 calculates a passenger pickup location route. The augmented reality transportation system 106 calculates or otherwise generates the passenger pickup location route to guide the passenger 116a to the ideal pickup location. Based on the historical information and/or the current information, the augmented reality transportation system 106 determines an ideal path for the passenger to navigate to the ideal pickup location.

As used herein, an ideal path refers to a path or route that is optimal or otherwise ideal based on one or more factors. Such factors can include, but are not necessarily limited to, speed, timing, a number of maneuvers, proximity, etc. For example, an ideal path can refer to a shortest path distance for the passenger 116a to navigate to the ideal pickup location, or else may refer to a fastest path time estimated for the passenger 116a to navigate to the ideal pickup location.

In any case, the augmented reality transportation system 106 determines an ideal path for the passenger pickup location route to guide the passenger to the ideal pickup location in accordance with one or more of the above-mentioned factors. For example, in some cases, the augmented reality transportation system 106 generates a passenger pickup location route to guide the passenger 116a to the ideal pickup location by using the fewest number of maneuvers.

While in some embodiments, the augmented reality transportation system 106 generates the passenger pickup location route automatically (e.g., without additional user input), in other embodiments the augmented reality transportation system 106 provides one or more options to the passenger 116a (e.g., by way of the passenger client device 112a) for the passenger 116a to select one or more path preferences.

For example, in these embodiments, the passenger 116a may select a preference for a passenger pickup location route that has the shortest distance to the ideal pickup location. Accordingly, in response to receiving the passenger preferences (e.g., selections from within the augmented reality transportation application 114a), the augmented reality transportation system 106 generates a passenger pickup location route based on the received passenger preferences.

As also mentioned, the augmented reality transportation system 106 calculates a driver pickup location route. Similar to how the augmented reality transportation system 106 generates a passenger pickup location route, as described above, the augmented reality transportation system 106 also generates a driver pickup location route to guide the driver 104 to the ideal pickup location. To illustrate, the augmented reality transportation system 106 generates a route that includes a series of maneuvers to guide the driver 104 (e.g., within the transportation vehicle 103) to the ideal pickup location.

In addition, in some embodiments, the augmented reality transportation system 106 provides one or more options to the driver 104 by way of the driver device 118 by which the driver 104 may select one or more driver preferences for the driver pickup location route. For example, the driver 104 may select a preference to navigate a driver pickup location that passes by a particular part of town to potentially pickup up other passengers for additional fares on the way to the ideal pickup location.

In any case, once the augmented reality transportation system 106 generates a passenger pickup location route and/or a driver pickup location route, the augmented reality transportation system 106 generates an augmented reality element, as shown by act 212 of the sequence 200 in FIG. 2. For example, the augmented reality transportation system 106 generates an augmented reality element for the ideal pickup location.

To generate the augmented reality element for the ideal pickup location, in some embodiments the augmented reality transportation system 106 determines a GPS location, dimensions, and/or other attributes of the ideal pickup location as described above. For example, the augmented reality transportation system 106 utilizes these attributes of the ideal pickup location to define the augmented reality element. To illustrate, the augmented reality transportation system 106 determines a particular placement, a height, a width, a depth, a color, and/or other features for the augmented reality element within an augmented reality environment that the passenger 116a experiences by way of the passenger client device 112a.

In other embodiments, to generate the augmented reality element for the ideal pickup location, the augmented reality transportation system 106 constructs a three-dimensional virtual model of an object to mark the ideal pickup location. In some embodiments, the augmented reality transportation system 106 generates a three-dimensional model having a given height, width, depth, color, etc., and further determines a placement for the augmented reality element at the ideal pickup location. Additional detail regarding the appearance and placement of the augmented reality element is provided below with reference to FIGS. 5-8.

In some embodiments, the augmented reality transportation system 106 generates more than one augmented reality element. For example, the augmented reality transportation system 106 may generate an augmented reality element to mark ideal pickup location, and the augmented reality transportation system 106 may additionally generate an augmented reality element to mark a location of the transportation vehicle 103. The augmented reality transportation system 106 may also generate an augmented reality element to mark each of a series of maneuvers within the passenger pickup location route and/or other to mark a no pickup location.

As used herein, a no pickup location refers to a location where pickup cannot or should not take place. Indeed, in some cases a no pickup location can include a location where it is illegal to park a car or illegal to block a fire hydrant or other municipal utility implement. In other cases, a no pickup location can include a location where it is historically congested or otherwise has historically been undesirable to use as a pickup location. For example, a narrow one-way street with no street parking may be determined to be undesirable to use as a pickup location. In these or other cases, a no pickup location can also include a location where previous passengers and/or previous drivers have designated as a location where pickup is difficult or not feasible.

As further illustrated by act 214 shown in FIG. 2, the augmented reality transportation system 106 provides the augmented reality element(s) to the passenger client device 112a. For example, the augmented reality transportation system 106 provides a location (e.g., the ideal pickup location) to place the augmented reality element to mark the ideal pickup location. The augmented reality transportation system 106 further provides a placement for each additional augmented reality element such as, for example, augmented reality elements to mark each maneuver in the passenger pickup location route and/or to mark a no pickup location.

Though not illustrated in FIG. 2, in some embodiments, the augmented reality transportation application 106 may not generate an augmented reality element (act 212) and provide the augmented reality element (act 214) to the passenger client device 112a, but may instead provide instructions to the passenger client device 112a to generate the augmented reality element. Indeed, in these embodiments, the augmented reality transportation system 106 provides GPS coordinates or other location information to the passenger client device 112a to instruct the passenger client device 112a to generate an augmented reality element and to overlay the augmented reality element on a portion of the display of the real world so as to appear to place the augmented reality element at the particular GPS location. Additionally, the augmented reality transportation system 106 provides instructions relating to the shape, color, dimensions, or other attributes of the augmented reality element to instruct the passenger client device 112a to generate and display the augmented reality element in accordance with the attributes.

FIG. 2 further illustrates act 216 of sequence 200 which depicts that the passenger client device 112a presents the augmented reality element. For example, upon receiving the augmented reality element(s) from the augmented reality transportation system 106, the passenger client device 112a renders a three-dimensional augmented reality environment for display to the passenger 116a. The augmented reality environment includes a display of the real world (e.g., as seen through a pair of glasses), and further includes the computer-generated augmented reality element(s) placed within the view of the real-world. For instance, the passenger client device 112a places the augmented reality element(s) within the augmented reality environment such that, from the perspective of the passenger 116a observing the world through the passenger client device 112a, the augmented reality element(s) appear to blend in or fit with the real-world setting.

Figure 3:
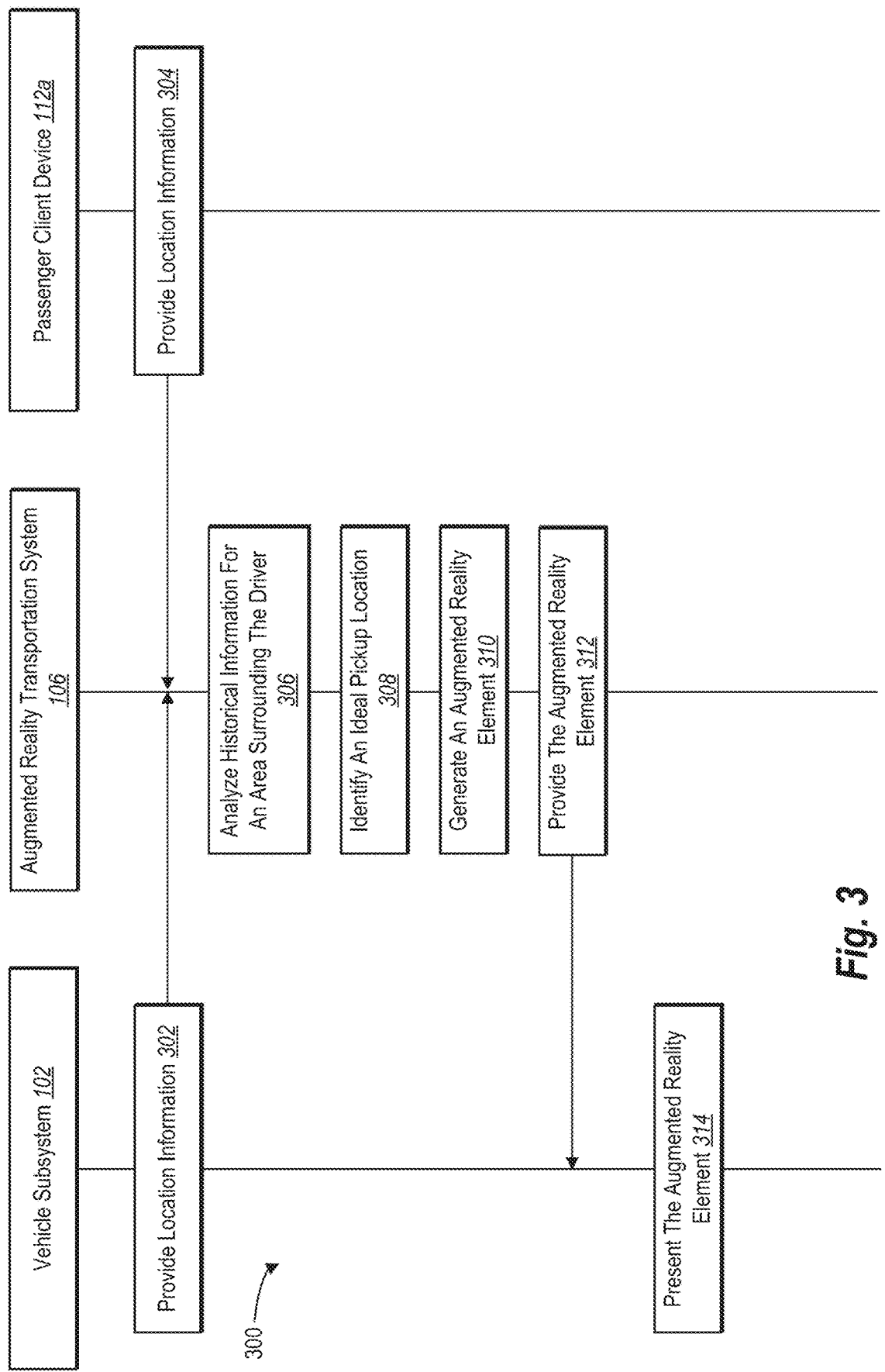
FIG. 3 illustrates a sequence diagram for presenting an augmented reality pickup element in accordance with one or more embodiments.

FIG. 3 illustrates a sequence 300 of acts performed by the vehicle subsystem 102, the augmented reality transportation system 106, and/or the passenger client device 112a. For example, as illustrated by FIG. 3, the vehicle subsystem 102 provides location information to the augmented reality transportation system 106, as depicted by act 302. As discussed above, the vehicle subsystem 102 determines a location by way of a GPS locator device within the transportation vehicle 103, the driver client device 118, or other device, and provides the location information in the form of GPS coordinates, a street address, or other form to the augmented reality transportation system 106.

Additionally, the passenger client device 112a provides location information to the augmented reality transportation system 106, as depicted by act 304 of FIG. 3. For example, and as discussed above, the passenger client device 112a includes a GPS device by which the passenger client device 112a determines a location of the passenger 116a. The passenger client device 112a then transmits the GPS location information to the augmented reality transportation system 106.

As illustrated by FIG. 3, the augmented reality transportation system 106 receives the location information from the vehicle subsystem 102 and the passenger client device 112a. In response to receiving the location information, the augmented reality transportation system 106 determines an area around the passenger 116a and/or an area around the vehicle subsystem 102 (e.g., around the transportation vehicle 103 and/or around the driver 104). Similar to the discussion above regarding the area around the passenger 116a, the augmented reality transportation system 106 determines an area within a given number of city blocks or else determines an area within a given radius of the driver 104 and/or the transportation vehicle 103.

Upon determining the area around the driver 104, the augmented reality transportation system 106 analyzes historical information corresponding to the area around the driver 104, as illustrated by act 306 of FIG. 3. For example, the augmented reality transportation system 106 accesses historical information from within route database 108 and that corresponds to the determined area around the driver 104. For instance, the augmented reality transportation system 106 identifies a location where a given item of historical information took place, and for items that took place within the determined area around the driver 104, the augmented reality transportation system 106 treats those items as relevant to the driver 104.

To illustrate, the augmented reality transportation system 106 analyzes historical information for previous drivers who were within the determined area around the driver 104 in the past. For example, the augmented reality transportation system analyzes historical information including but not limited to, previous driver preferences for pickup locations, historical traffic information in the area, previous driver navigation time to various pickup locations (e.g., for pickup locations inside and/or outside the area around the driver 104), etc. It will be understood from the disclosure herein that the augmented reality transportation system 106 analyzes the historical information for the area around the driver 104 just as the augmented reality transportation system 106 analyzes the historical information for the area around the passenger 116a, as discussed above with reference to FIG. 2.

In addition to analyzing the historical information for the area around the driver 104, the augmented reality transportation system identifies an ideal pickup location, as shown by act 308 of FIG. 3. Indeed, as discussed above, the augmented reality transportation system 106 determines a number of possible pickup locations, ranks the possible pickup locations according to one or more factors-weighted factors, in some cases—and determines an ideal pickup location from among the possible pickup locations. Additional detail regarding the determination of possible pickup locations, ranking possible pickup locations, and weighting various factors considered as part of identifying an ideal pickup location is provided above with reference to FIG. 2.

In some embodiments, the augmented reality transportation system 106 provides an option for the driver 104 to select a preference of a pickup location or else to select one or more factors to weight more heavily than others for determining the ideal pickup location. In other embodiments, the augmented reality transportation system 106 determines the ideal pickup location automatically (e.g., without driver input) based on the ranking of the plurality of possible pickup locations.

As illustrated in FIG. 3, upon identifying the ideal pickup location, the augmented reality transportation system 106 further generates an augmented reality element to mark the ideal pickup location, as shown by act 310. For example, the augmented reality transportation system 106 generates a three-dimensional augmented reality object having a given height, width, depth, color, etc., as described above with reference to FIG. 2. The augmented reality transportation system 106 may further generate additional augmented reality elements to mark maneuvers within a driver pickup location route, and/or to mark the location of the passenger 116a.

In response to generating the augmented reality element to mark the idea pickup location, as well as the other augmented reality element(s), the augmented reality transportation system 106 provides the augmented reality element(s) to the vehicle subsystem 102, as shown by act 312 of FIG. 3. For example, the augmented reality transportation system 106 provides the computer-generated augmented reality element(s) and the placement location of each element to the driver client device 118.

Though not illustrated in FIG. 3, in some embodiments, the augmented reality transportation application 106 may not generate an augmented reality element (act 310) and/or provide the augmented reality element (act 312) to the vehicle subsystem 102, but may instead provide instructions to the vehicle subsystem 102 to generate the augmented reality element. Indeed, in these embodiments, the augmented reality transportation system 106 provides GPS coordinates or other location information to the vehicle subsystem 102 to instruct the driver client device 118 or other component of the vehicle subsystem 102 to generate an augmented reality element to and to overlay the augmented reality element on a portion of the display of the real world so as to appear to place the augmented reality element at the particular GPS location. Additionally, the augmented reality transportation system 106 provides instructions relating to the shape, color, dimensions, or other attributes of the augmented reality element to instruct the vehicle subsystem 102 to generate and display the augmented reality element in accordance with the attributes.

As illustrated in FIG. 3, upon receiving the augmented reality element(s), the vehicle subsystem 102 presents the augmented reality element(s) to the driver 104. For example, the driver client device 118 presents an augmented reality environment to the driver 104 (e.g., as the driver 104 looks through a headset as part of the driver client device 118), where the augmented reality environment includes a view of the real world in addition to an overlay of the augmented reality element(s) placed on the view of the real world in such a way as to appear naturally placed and integrated into the environment of the real-world settings. Additional detail regarding the placement and appearance of the augmented reality elements from the perspective of the driver 104 is provided below with reference to FIGS. 7-8.

Figure 4:
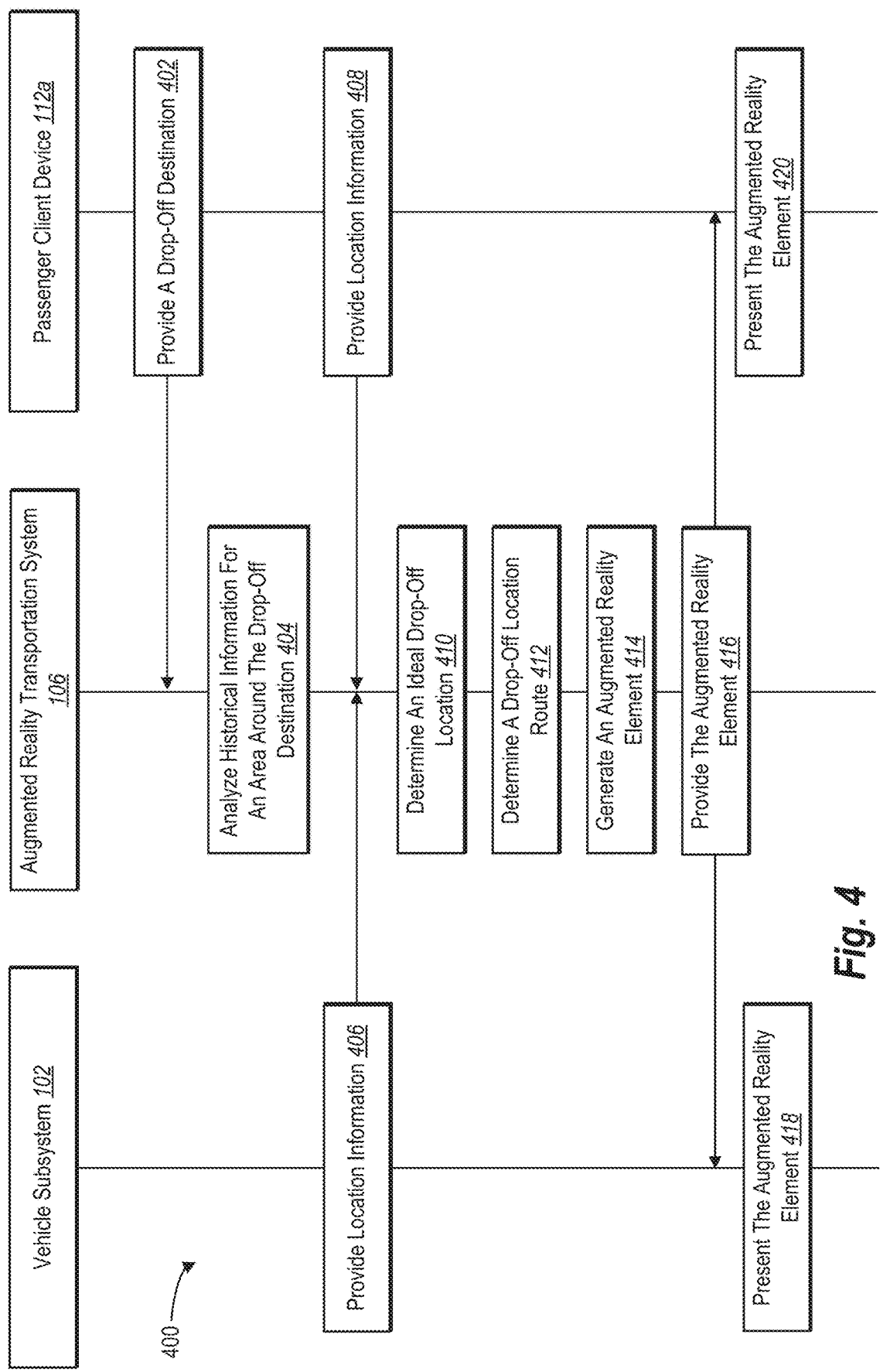
FIG. 4 illustrates a sequence diagram for presenting an augmented reality drop-off element in accordance with one or more embodiments.

FIG. 4 illustrates a sequence 400 of a series of acts performed by actors such as the vehicle subsystem 102, the augmented reality transportation system 106, and/or the passenger client device 112a. Like FIGS. 2-3, although the sequence 400 of FIG. 4 includes a specific number of acts and further illustrates each particular act as corresponding to a particular actor, in some embodiments additional or alternative acts are possible, as are additional or alternative arrangements of the acts, which may be performed by different or additional actors.

As illustrated by sequence 400 of FIG. 4, the passenger client device 112a provides a drop-off destination to the augmented reality transportation system 106, as depicted by act 402. For example, the passenger client device 112a provides an option (e.g., by way of the augmented reality transportation application 114a) for the passenger 116a to select a desired drop-off location. Upon receiving the input from the passenger 116a, the passenger client device 112a identifies a GPS location or a street address of the desired drop-off destination and provides the GPS location and/or street address to the augmented reality transportation system 106.

Upon receiving the drop-off destination information (e.g., the GPS location information or street address), the augmented reality transportation system 106 analyzes historical information for an area around the drop-off destination. For example, the augmented reality transportation system 106 defines an area around the drop-off destination as an area within a given number of city blocks, an area within a given radius of the drop-off destination, or some other defined area around the drop-off destination. In addition, the augmented reality transportation system 106 accesses historical information corresponding to GPS locations and/or street addresses within the determined area around the drop-off destination.

For example, the augmented reality transportation system 106 accesses historical traffic information for the area around the drop-off destination, information from previous vehicle subsystems that transported previous passengers to previous drop-off locations within the area around the drop-off destination (e.g., information relating to travel time, preferred drop-off locations, preferred drop-off location routes, etc.), and other historical information as described in further detail above. Upon accessing the historical information corresponding to the area around the drop-off destination, the augmented reality transportation system 106 analyzes the historical information to determine correlations between various data within the historical information.

For instance, in some embodiments, the augmented reality transportation system 106 trains a machine learning model to analyze the historical information to predict future results based on past information. For instance, in cases where a large number of previous drivers dropped off previous passengers at a particular place within the area around the drop-off destination, then the augmented reality transportation system 106 may predict that that location is a good drop-off location. The augmented reality transportation system 106 can make predictions based on other historical information as well, such as historical traffic information. To illustrate, the augmented reality transportation system 106 may predict that a particular area that has historically bad traffic (e.g., is highly congested) at a particular time of day will have bad traffic at the same time of day in the future as well. Accordingly, the augmented reality transportation system 106 may avoid choosing a drop-off location within the areas that have such bad traffic.

Though not illustrated in FIG. 4, the augmented reality transportation system 106 may also analyze historical information for the area around the passenger 116*a* and/or around the transportation vehicle 103, as described above with reference to FIG. 2. Indeed, as illustrated in FIG. 4, the vehicle subsystem 102 provides location information to the augmented reality transportation system 106, as depicted by act 406. Similarly, as illustrated by act 408, the passenger client device 112*a* also provides location information to the augmented reality transportation system 106.

In response to receiving the location information from the vehicle subsystem 102 and/or the passenger client device 112*a*, the augmented reality transportation system 106 analyzes historical information for the area around the passenger 116*a* and/or the area around the vehicle subsystem 102, as described in further detail above with reference to FIG. 2. In some cases, when the vehicle subsystem 102 picks up the passenger 116*a* (e.g., at the ideal pickup location), the location information for the passenger client device 112*a* and the vehicle subsystem 102 will be the same or substantially the same. Accordingly, the augmented reality transportation system 106 may analyze a single set of historical information—i.e., historical information that pertains to both the area around the passenger 116*a* as well as the area around the vehicle subsystem 102, because the passenger 116*a* is inside the transportation vehicle 103 and the area around the passenger 116*a* is the same or substantially the same as the area around the vehicle subsystem 102.

Upon receiving the location information and analyzing the historical information, the augmented reality transportation system 106 determines an ideal drop-off location, as illustrated by act 410 of FIG. 4. As used herein, an ideal drop-off location refers to a drop-off location where the transportation vehicle 103 drops off the passenger 116*a* and that the augmented reality transportation system 106 assigns as the drop-off location. The ideal drop-off location may include an ideal location based on one or more factors described above with relation to the discussion of the ideal pickup location of FIG. 2. Additionally, the ideal drop-off location may be based on different or additional factors. For instance, the ideal drop-off location may include a location that is in an area that is closest in proximity to the passenger's desired destination, or else a location that provides the passenger 116*a* the fastest route to the desired destination.

For example, the augmented reality transportation system 106 determines an ideal placement for the drop-off location by analyzing the historical information as well as current information. For instance, the augmented reality transportation system 106 analyzes current traffic information to estimate a travel time to navigate to the drop-off location. The augmented reality transportation system 106 may adjust the placement of the ideal drop-off location based on analyzing the current information to identify the ideal drop-off location according to one or more factors. For example, in some cases the passenger 116*a* desires to be delivered to a location closest in proximity to the desired destination, in which case the augmented reality transportation system 106 will identify such location as the ideal drop-off location. Alternatively, in other cases, the passenger 116*a* selects an option (e.g., by way of the passenger client device 112*a*) to choose a drop-off location that will result in the shortest overall travel time for the passenger 116*a* to navigate to the desired destination. In these cases, the augmented reality transportation system 106 may adjust the location of the desired drop-off location based on current traffic information to save time.

Furthermore, in some embodiments, the augmented reality transportation system 106 determines more than one location as possible drop-off locations. In one or more embodiments, the augmented reality transportation system 106 determines a possible drop-off location that is closest in proximity to the desired destination, another possible drop-off location that has the shortest estimated total travel time, another possible drop-off location that has the shortest overall travel distance, and another possible drop-off location that has historically been a popular drop-off destination. Accordingly, the augmented reality transportation system 106 may select possible drop-off locations according to optimizing for various factors.

The augmented reality transportation system 106 also ranks the possible drop-off locations according to the various factors. To illustrate, the augmented reality transportation system 106 weights each factor according to passenger factor preference (e.g., as indicated by way of the passenger client device 112*a*), driver factor preference (e.g., as indicated by way of the driver client device 118), and/or historical preferences of previous passengers and/or previous drivers. The augmented reality transportation system 106 thereby ranks each of the possible drop-off locations based on the weighted factors.

Additionally, similar to the possible pickup locations discussed above with reference to FIG. 2, the augmented reality transportation system 106 determines possible drop-off locations and may, in some cases, provide a listing or other presentation of the possible pickup locations (e.g., by address, GPS coordinate, by placing pins on a map, or by placing augmented reality elements within an augmented reality environment) to the passenger 116*a* by way of the passenger client device 112*a*. Accordingly, the passenger 116*a* may select a preferred drop-off location from among the possible drop-off locations. The augmented reality transportation system 106 assigns the selected drop-off location as the ideal drop-off location.

In some embodiments, the augmented reality transportation system 106 provides one or more options to the driver 104 by way of the driver client device 118 for the driver 104 to select a preferred drop-off location. In these or other embodiments, the augmented reality transportation system 106 assigns the driver-selected drop-off location as the ideal drop-off location. Alternatively, the augmented reality transportation system 106 waits to receive input from the passenger 116*a* indicating a preferred drop-off location. If the augmented reality transportation system 106 receives passenger input indicating a preferred drop-off location, the augmented reality transportation system 106 assigns the passenger-preferred drop-off location as the ideal drop-off location, regardless of driver input. In other embodiments, the augmented reality transportation system 106 assigns the driver-selected drop-off location as the ideal drop-off location.

Once the augmented reality transportation system 106 determines an ideal drop-off location, the augmented reality transportation system determines a drop-off location route, as illustrated by act 412 within the sequence 400 of FIG. 4. For instance, the augmented reality transportation system 106 calculates a route to guide the driver 104 to the ideal drop-off location. As described above, the drop-off location route includes a series of maneuvers to navigate to the ideal drop-off location.

As illustrated in FIG. 4, the sequence 400 further includes an act 414 depicting that the augmented reality transportation system 106 generates an augmented reality element. For example, the augmented reality transportation system 106 generates an augmented reality element to mark the ideal drop-off location. Referring to the discussion of FIG. 2 above, the augmented reality transportation system 106 generates an augmented reality element by determining a placement, a height, a width, a depth, and/or a color of the augmented reality element to mark the ideal drop-off location. The augmented reality transportation system 106 additionally generates augmented reality elements to mark various maneuvers of the drop-off location route, and generates augmented reality elements to mark other destinations, landmarks, etc.

In addition, the augmented reality transportation system 106 provides the augmented reality element to the vehicle subsystem 102 and to the passenger client device 112a, as illustrated by act 416 of FIG. 4. To provide the augmented reality element, the augmented reality transportation system 106 provides a location to place the augmented reality element as well as other attribute information for the augmented reality element such as dimensions and/or color.

As further illustrated in FIG. 4, the vehicle subsystem 102 presents the augmented reality element, as shown by act 418. To present the augmented reality element, the augmented reality transportation system 106 renders the augmented reality element as a three-dimensional virtual object within an augmented reality environment. For example, the driver client device 118 or the transportation vehicle 103 presents an augmented reality environment to the driver 104. The augmented reality environment includes a view of the real world in addition to an overlay of augmented reality elements displayed to fit in with the real world.

In some embodiments, the driver client device 118 presents the augmented reality environment including the augmented reality element(s) to mark the ideal drop-off location in addition to the drop-off location route. To illustrate, the driver 104 wears the driver client device 118 and views the real world through the driver client device 118. Accordingly, the driver client device 118 renders the augmented reality elements to appear as though they are placed at particular locations within the real world. For example, the driver client device 118 may render a drop-off location element on a section of sidewalk that indicates the ideal drop-off location.

In other embodiments, the transportation vehicle 103 presents the augmented reality environment including the augmented reality element(s) to the driver 104 and/or the passenger 116a. For example, in these embodiments, the transportation vehicle includes a windshield capable of rendering three-dimensional virtual objects as an overlay on the view of the real world such that the virtual objects appear to fit in with the real world—i.e., the virtual objects augment the real world.

Additionally shown in FIG. 4, the passenger client device 112a presents the augmented reality element, as depicted by act 420. For example, the passenger 116a wears the passenger client device 112a and views the real world through a lens of the passenger client device 112a. The passenger client device 112a also renders three-dimensional virtual objects in accordance with the information received from the augmented reality transportation system 106. For instance, in response to receiving information for an augmented reality element, the passenger client device 112a renders the augmented reality element as an overlay of the view of the real world. Additional detail regarding the appearance and placement of the augmented reality elements is provided below with reference to FIGS. 5-8.

Figure 5:
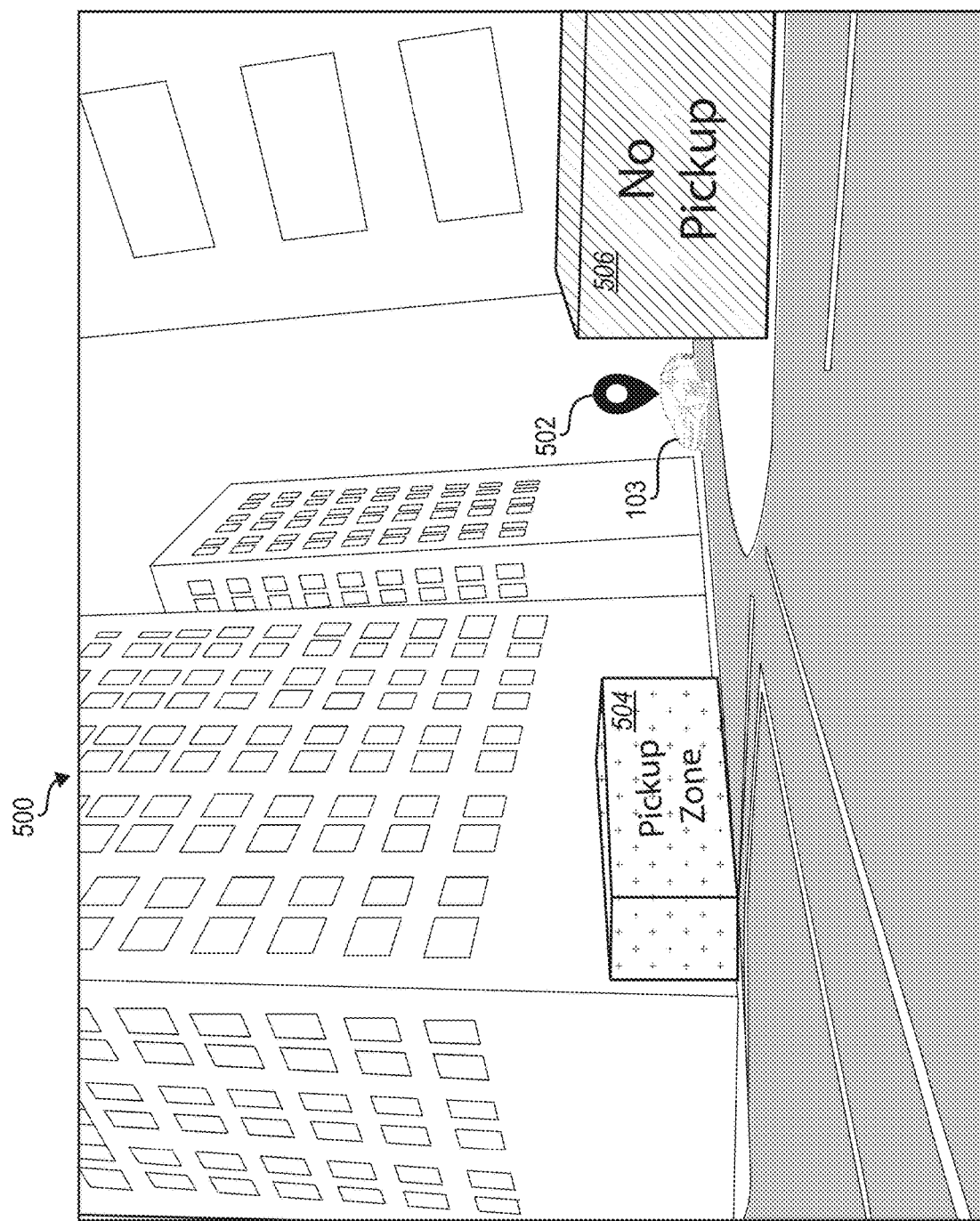
FIG. 5 illustrates an example augmented reality environment from a passenger perspective in accordance with one or more embodiments.

FIG. 5 illustrates an example augmented reality environment 500 from the perspective of the passenger 116a. For example, the passenger 116a sees the augmented reality environment 500 by way of the passenger client device 112a—i.e., the passenger 116a looks through glasses or a lens of the passenger client device 112a to see the augmented reality environment 500. As shown in FIG. 5, the passenger 116a sees a view of the real world together with augmented reality elements. For example, the augmented reality environment 500 includes a view of a street corner within a city, and further includes an augmented reality transportation vehicle location element 502, an augmented reality pickup location element 504 (labeled "Pickup Zone"), and an augmented reality no pickup location element 506 (labeled "No Pickup").

The augmented reality environment 500 includes a view of the transportation vehicle 103 that the passenger 116a sees driving down the street. Above the transportation vehicle 103, the augmented reality environment 500 includes the augmented reality transportation vehicle element 502 that marks the location of the transportation vehicle 103. For example, the augmented reality transportation vehicle element stays in a location above the transportation vehicle 103 to mark the location while the passenger 116a moves and looks in other directions, as well as while the transportation vehicle 103 moves within the view of the augmented reality environment 500. In addition to the transportation vehicle 103, passenger client device 112a displays the augmented reality environment 500 including the real-world view of buildings, streets, sidewalks, and other objects within the real-world setting.

As mentioned, the augmented reality environment 500 further includes the augmented reality pickup location element 504 that marks the ideal pickup location. For example, the augmented reality pickup location element 504 sits in a particular location within the augmented reality environment 500. As seen in FIG. 5, the passenger client device 112a renders the augmented reality pickup location element 504 on a portion of sidewalk such that the augmented reality pickup location element 504 appears to fit as part of the real world. In other words, the angles and perspective of the augmented reality pickup location element 504 match the angles and perspective of the sidewalk. Additionally, as the perspective of the passenger 116a changes with a head turn or other movement, the augmented reality pickup location element 504 persists on the same location within the augmented reality environment 500. That is to say, the augmented reality pickup location element 504 changes attributes to shrink in size (e.g., as the passenger 116a moves farther away), to increase in size (e.g., as the passenger 116a moves closer), to change angles of one or more sides (e.g., as the passenger 116a looks in a different direction), or otherwise reshape to constantly appear as though it sits on the same portion of sidewalk within the real world.

In addition, the augmented reality pickup location element 504 can also have various features or attributes. For example, the augmented reality pickup location element 504 can be transparent (e.g., such that real-world objects such buildings, people, etc. are visible through it), translucent, or opaque. Additionally, the augmented reality pickup location element 504 can include a color (e.g., pink, blue, green, etc.). Indeed, in some embodiments, the augmented reality transportation system 106 assigns a color to the augmented reality pickup location element 504 according to a color associated with the transportation vehicle 103 (e.g., associated with the amp of the transportation vehicle 103). For instance, the augmented reality transportation system 106 may assign a color or other unique identifier to the vehicle subsystem 102 (e.g., including the transportation vehicle 103) and the provide the unique identifier to the passenger client device 112a in accordance with the disclosure set forth in U.S. patent application Ser. No. 15/396,417, which is incorporated by reference herein, in its entirety.

As further illustrated by FIG. 5, the augmented reality environment 500 includes an augmented reality no pickup location element 506. For example, the augmented reality no pickup location element 506 designates an area within the real world that is undesirable, unfit, and/or illegal to use as a pickup location, in accordance with the disclosure provided above. For example, the augmented reality transportation system may play an augmented reality no pickup location element 506 at a location where previous passengers have given poor ratings as a pickup location, where pickup times are particularly long at the given location, etc. The augmented reality no pickup location element 506, like the augmented reality pickup location element 504, is placed on a section of sidewalk as displayed within the augmented reality environment 500. In addition, the augmented reality no pickup location element 506 includes functionality similar to that of the augmented reality pickup location element 504. Specifically, when the passenger 116a moves or looks in another direction, the augmented reality no pickup location element 506 remains in place within the augmented reality environment 500 with respect to the objects and other surroundings within the real-world setting.

Additionally, as can be seen in FIG. 5, the augmented reality no pickup location element 506 has different attributes than the augmented reality pickup location element 504. For instance, the augmented reality no pickup location element 506 may be a different color, a different size, have a different label (e.g., "No Pickup") to indicate to the passenger 116a that the marked section of sidewalk is not meant for pickup or is to be avoided.

Figure 6:
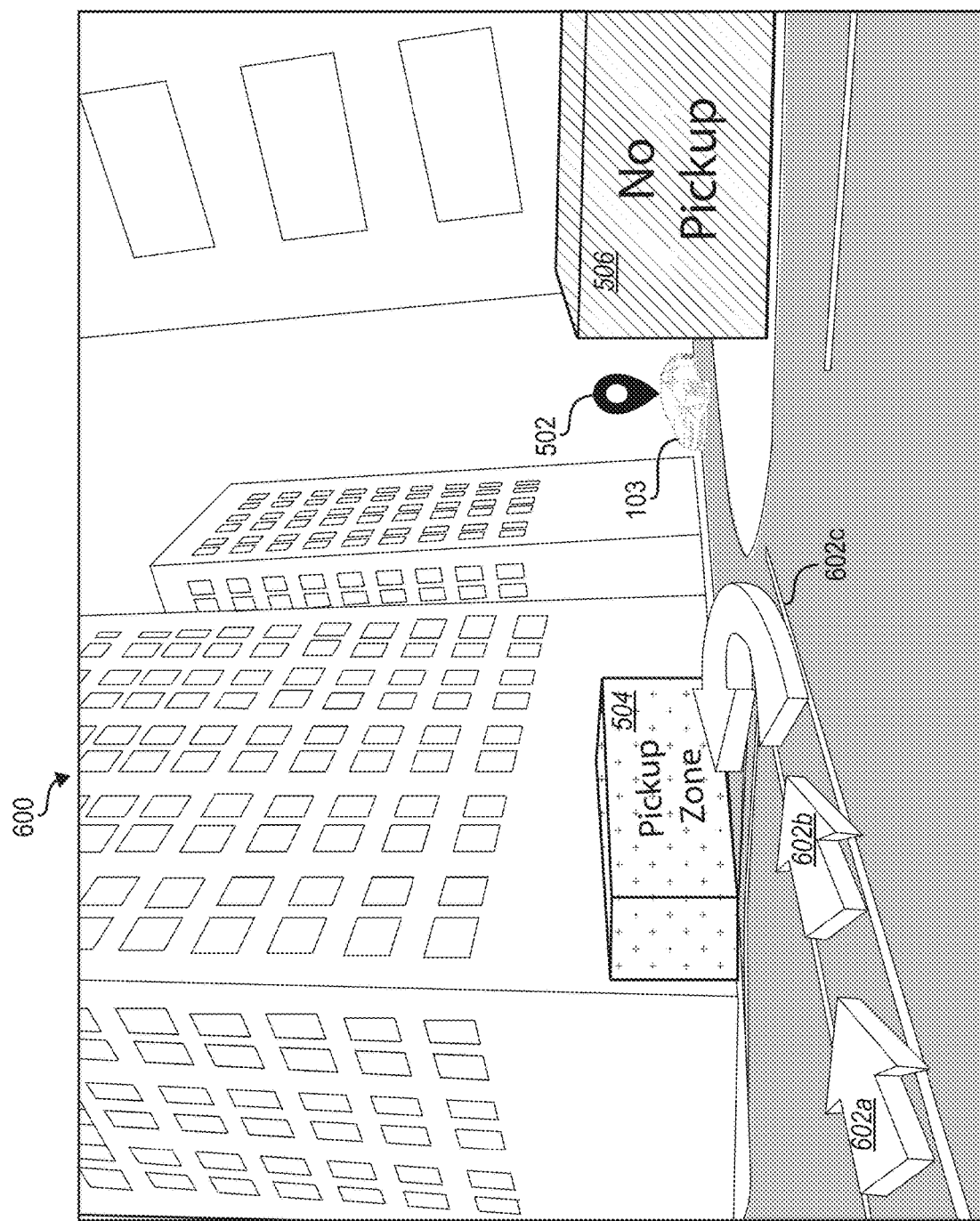
FIG. 6 illustrates an example augmented reality environment from a passenger perspective in accordance with one or more embodiments.

FIG. 6 also illustrates an example augmented reality environment 600 from the perspective of the passenger 116a. For example, the augmented reality environment 600 includes the augmented reality elements of FIG. 5 in addition to other augmented reality elements such as the pickup location route elements 602a, 602b, and 602c (referred to herein collectively as "pickup location route elements 602"). The pickup location route elements 602 mark the determined pickup location route to guide the passenger 116a to the ideal pickup location marked by the augmented reality pickup location element 504.

For example, the pickup location route element 602a indicates to the passenger 116a to begin crossing the crosswalk to reach the other side of the street. Pickup location route element 602b indicates to the passenger 116a to continue crossing the crosswalk, following the direction of the arrow. Furthermore, pickup location route element 602c indicates to the passenger 116a to turn left to cross the next street toward the ideal pickup location.

As can be seen in FIG. 6, the pickup location route elements 602 may include various attributes. For example, the pickup location route elements 602 have arrow shapes and may be three-dimensional. Indeed, in some embodiments, the pickup location route elements 602 appear to rest on surfaces such as roads, sidewalks, etc., while in other embodiments the pickup location route elements 602 may appear to float in the air. Additionally, while the augmented reality environment 600 of FIG. 6 includes only three pickup location route elements 602 having particular shapes and sizes, in other cases, other pickup location route elements may have different shapes and sizes to illustrate different route maneuvers such as, for example, a right turn, a stop, a U-turn, etc.

Furthermore, the pickup location route elements 602 may have other attributes such as a color. For example, the pickup location route elements 602 may be the same color as the augmented reality pickup location element 504. As described above, the augmented reality transportation system 106 may assign one color to the entire transportation experience—i.e., where the AMP within the transportation vehicle 103 displays the given color, where the passenger client device 112a indicates the color to the passenger 116a, where the augmented reality pickup location element 504 has the color, and where the pickup location route elements 602 also have the color. That way, the passenger 116a can more easily identify the ideal pickup location and the maneuvers required to get there, as well as more easily identify the transportation vehicle 103 as it arrives for pickup.

Figure 7:
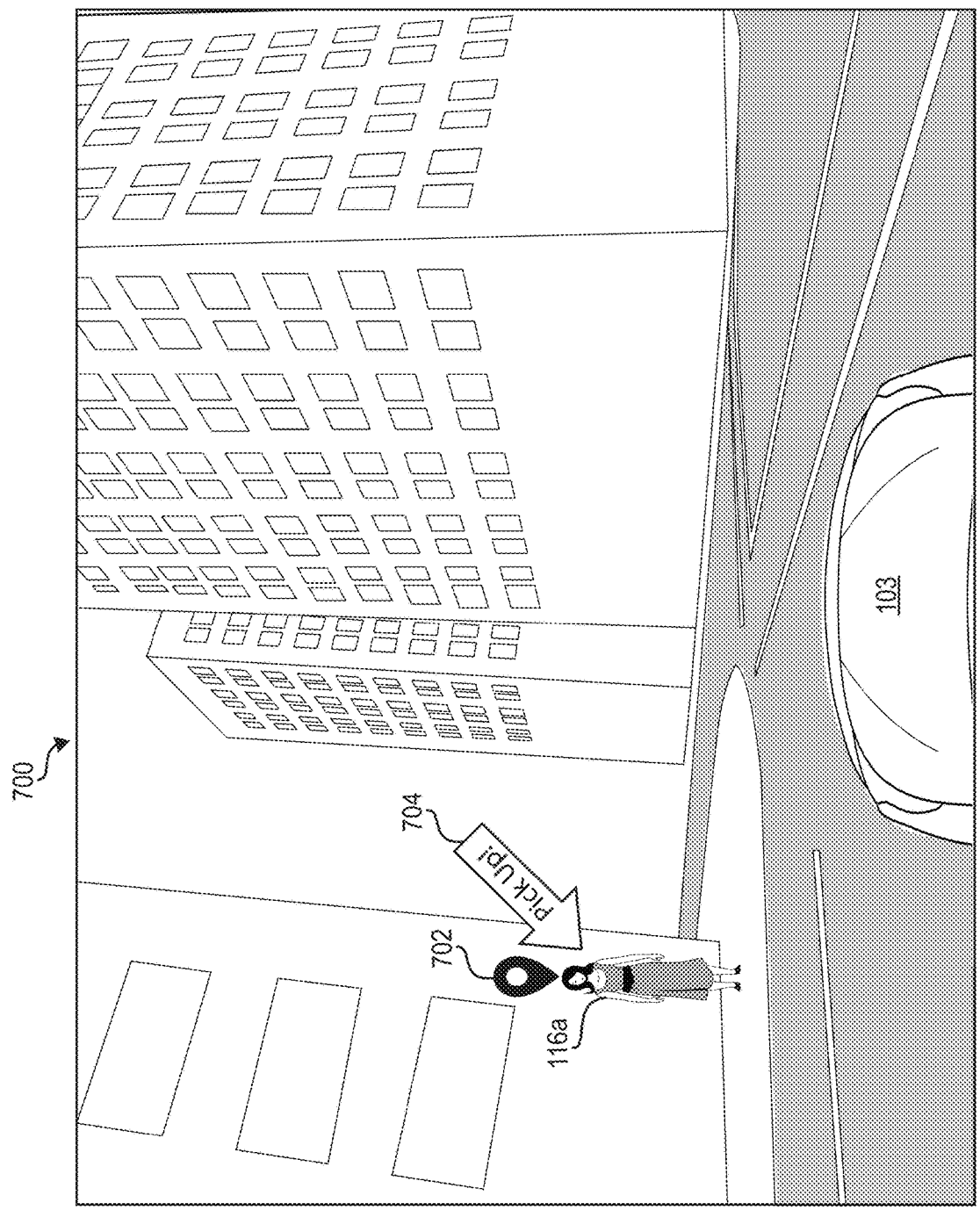
FIG. 7 illustrates an example augmented reality environment from a driver perspective in accordance with one or more embodiments.

FIG. 7 illustrates an example augmented reality environment 700 from the perspective of the driver 104. For example, the augmented reality environment 700 includes a view of the passenger 116a waiting for pickup on a street corner within a real-world view of a city. The driver 104 looks through the driver client device 118 or the windshield of the transportation vehicle 103 to see the augmented reality environment 700, including the real-world view of the city as well as the augmented reality elements such as the passenger location element 702 and the action element 704.

As shown in FIG. 7, the augmented reality transportation environment 700 includes the passenger location element 702. For example, the passenger location element 702 is located above the passenger 116a within the augmented reality environment 700. For instance, the passenger location element 702 appears to follow the passenger 116a when the passenger 116a changes location or when the perspective of the augmented reality environment 700 changes due to the driver 104 looking another direction or driving the transportation vehicle 103.

To keep the passenger location element 702 above the passenger 116a—i.e., to constantly mark the location of the passenger 116a within the augmented reality environment 700—the passenger client device 112a updates the passenger location information by way of the GPS locator device thereon. In response to updating the location information, the passenger client device 112a updates the placement of the passenger location element 702 within the augmented reality environment 700 to remain consistent with the current location of the passenger 116a.

As also illustrated in FIG. 7, the augmented reality environment 700 further includes the action element 704. For example, the action element 704 indicates an action such as, for example, a set of directions or a command to the driver 104. As illustrated in FIG. 7, the action element 704 is in the shape of an arrow pointed at the passenger 116a and includes the command, "Pick Up!" Accordingly, the action element 704 provides directions or other commands to the driver 104 as the driver 104 navigates to pick up the passenger 116a. For instance, the action element 704 may be an indicator in the form of a stop sign to direct the driver 104 to avoid a particular road due to bad traffic, an accident, or for some other reason. Additional or alternative action elements are also possible.

Though not illustrated in FIG. 7, the augmented reality environment 700 may further include the augmented reality pickup location element 504. Similar to the discussion above with reference to FIGS. 5-6, the augmented reality pickup location element 504 is placed at the ideal pickup location, and the driver 104 sees the augmented reality pickup location element 504 within the augmented reality environment 700. As an example, the passenger 116a in FIG. 7 may be standing at the ideal pickup location and within the augmented reality pickup location element 504 described above. Thus, augmented reality transportation system 106 provides the same augmented reality pickup location element 504 to the passenger client device 112a as well as to the driver client device 118. However, the passenger client device 112a and the driver client device 118 render the augmented reality pickup location element 504 from different perspectives, as described above.

The augmented reality environment 700 may still further include one or more pickup location route elements as well. For example, the augmented reality environment 700 may include pickup location route elements in the form of arrows or other shapes to guide the driver 104 to the ideal pickup location.

Figure 8:
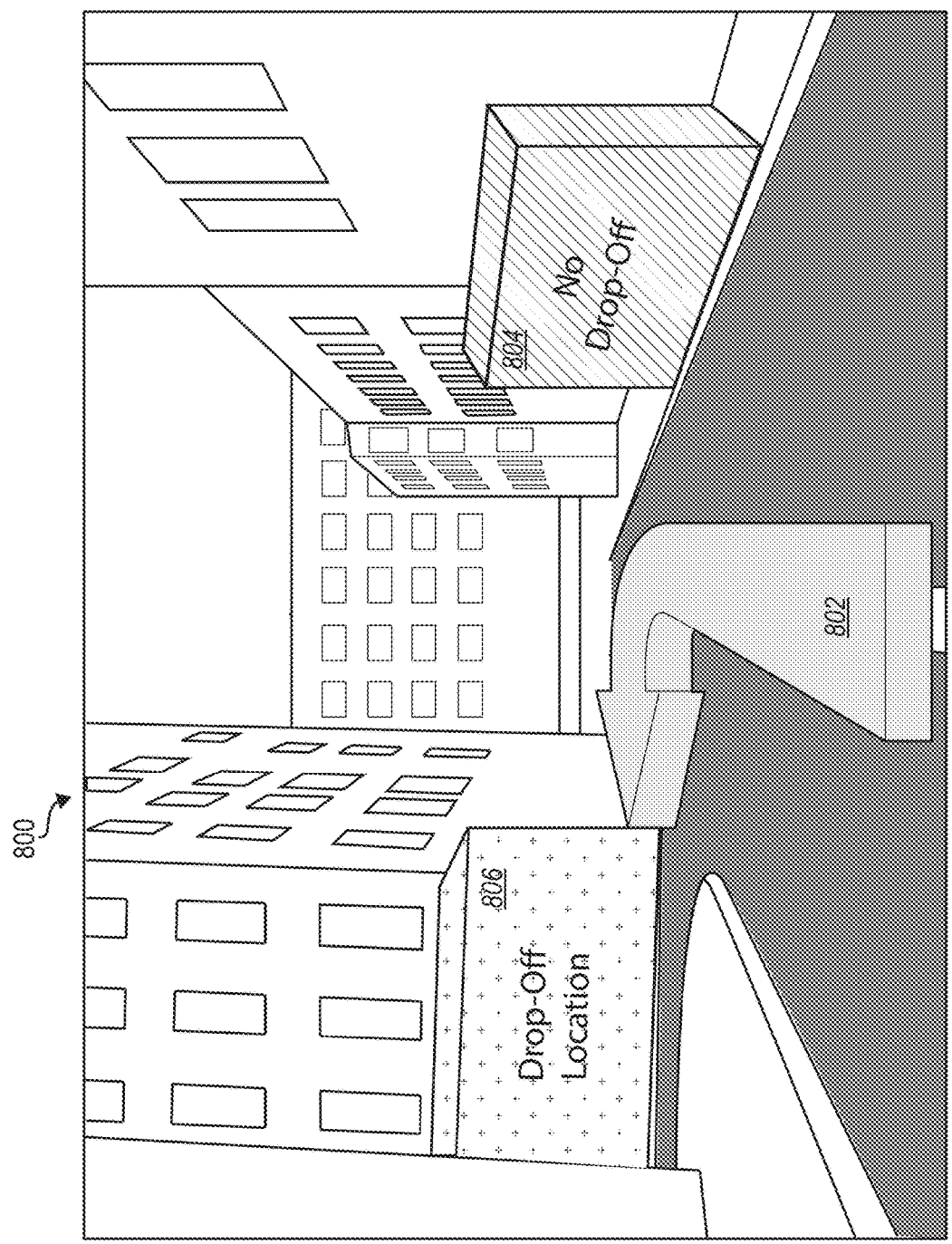
FIG. 8 illustrates an example augmented reality environment for a drop-off route in accordance with one or more embodiments.

FIG. 8 illustrates an example augmented reality environment 800 from the perspective of the driver 104 and/or the passenger 116a. The augmented reality environment 800 illustrates a perspective that the driver 104 and/or the passenger 116a experience from within the transportation vehicle 103 while navigating to the ideal drop-off location (e.g., after picking up the passenger 116a at the ideal pickup location). For example, FIG. 8 depicts the augmented reality environment 800 including a drop-off route element 802, a no drop-off location element 804, and a drop-off location element 806.

The drop-off route element 802 guides the driver 104 to the ideal drop-off location, as described above. For instance, the drop-off route element 802, as seen in FIG. 8, is a left-turn arrow that indicates to the driver to make a left turn at the next street. As illustrated in FIG. 8, the drop-off route element 802 can appear as though it is resting on the street or as though it is floating in the air within the augmented reality environment 800. The drop-off route element 802 guides the driver 104 to the ideal drop-off location marked by the drop-off location element 806. Although FIG. 8 illustrates a single drop-off route element 802, in other examples the augmented reality environment 800 can include multiple drop-off route elements to illustrate multiple maneuvers throughout the drop-off location route.

As discussed above with reference to FIGS. 5-7, the drop-off route element 802, like the pickup route elements 602 of FIG. 6, is three-dimensional and includes various features such as a color, a size, and a shape. As described above with regard to the pickup location elements 602, the drop-off location element 802 may also have the same color as the AMP within the transportation vehicle 103. Accordingly, the augmented reality transportation system 106 may thematically organize the transportation experience from start to finish for the passenger 116a. To do so, the augmented reality transportation system 106 assigns a color or other theme indicator that the passenger 116a can recognize in pickup location elements 602, an augmented reality pickup location element 504, a drop-off route element 802, as well as a drop-off location element 806.

As illustrated in FIG. 8, the augmented reality environment 800 further includes a no drop-off location element 804. The no drop-off location element 804 marks a location such as, for example, a section of sidewalk where it is undesirable to drop off the passenger 116a for one reason or another. For instance, the no drop-off location element 804 may mark a location of a fire hydrant. In other examples, the no drop-off location element 804 may mark a location where it is otherwise illegal to drop off passengers or park a car. In still other examples, the no drop-off location element 804 may mark a location where pedestrian and/or street traffic is particularly congested or else may mark a location where previous drivers and/or previous passengers have indicated as a bad choice for a drop-off location.

The no drop-off location element 804 may also include features such as size, shape, and/or color. For example, the no drop-off location element 804 may have a color different from the AMP of the transportation vehicle 103 to set the no drop-off location element 804 apart, and to make it easily recognizable as a location that is bad for dropping off the passenger 116a.

Furthermore, the augmented reality environment 800 of FIG. 8 also includes a drop-off location element 806. The drop-off location element 806 marks the ideal drop-off location described above. In addition, the drop-off location element 806 may include various features such as size, shape, and color, as described above. The drop-off location element 806 (as well as the no drop-off location element 804) may change in size as the driver 104 drives closer or farther from the element, as described above with reference to FIGS. 5-6. This way, the passenger 116a and the driver 104 viewing the augmented reality environment 800 see the elements as though they are real-world objects that change perspective and size as the passenger 116a and driver 104 change vantage points.

In some embodiments, the passenger 116a and/or the driver 104 may share the augmented reality environment 800 (or augmented reality environments 500, 600, or 700) with another passenger or driver. In other words, the augmented reality transportation system 106 provides an option for the passenger 116a to transmit or otherwise provide a live stream of the augmented reality environment 800 that the passenger 116a currently sees to another passenger (e.g., passenger 116b). In response, the augmented reality transportation system 106 provides the stream of the augmented reality environment 800 to passenger 116b so that passenger 116b can observe the progress of the transportation vehicle 103 by way of the passenger client device 112b.

Furthermore, the augmented reality transportation system 106 provides an option for the driver 104 to share a view of the augmented reality environment 800 with another driver or with the passenger 116b. In these embodiments, the augmented reality transportation system 106 provides detailed route information to the passenger 116b with a first-person view of the augmented reality environment 800 so that, in the case where the passenger 116b is also waiting for pickup from the transportation vehicle 103, the passenger 116b can see first-hand what might be causing any delays or exactly how progress is going along a particular route.

Figure 9:
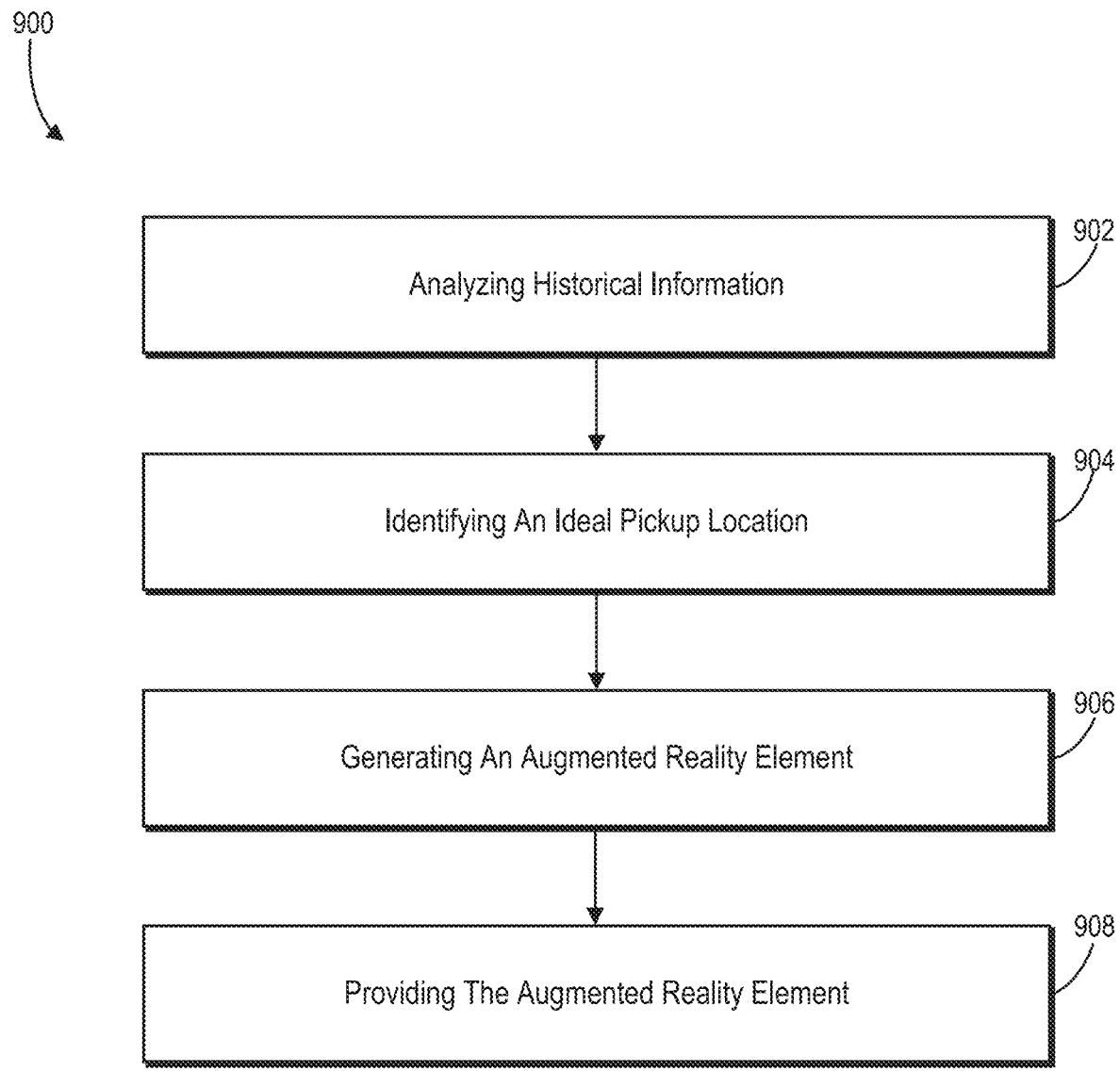
FIG. 9 illustrates a flowchart of a series of acts in a method of providing an augmented reality pickup element in accordance with one or more embodiments.
Figure 10:
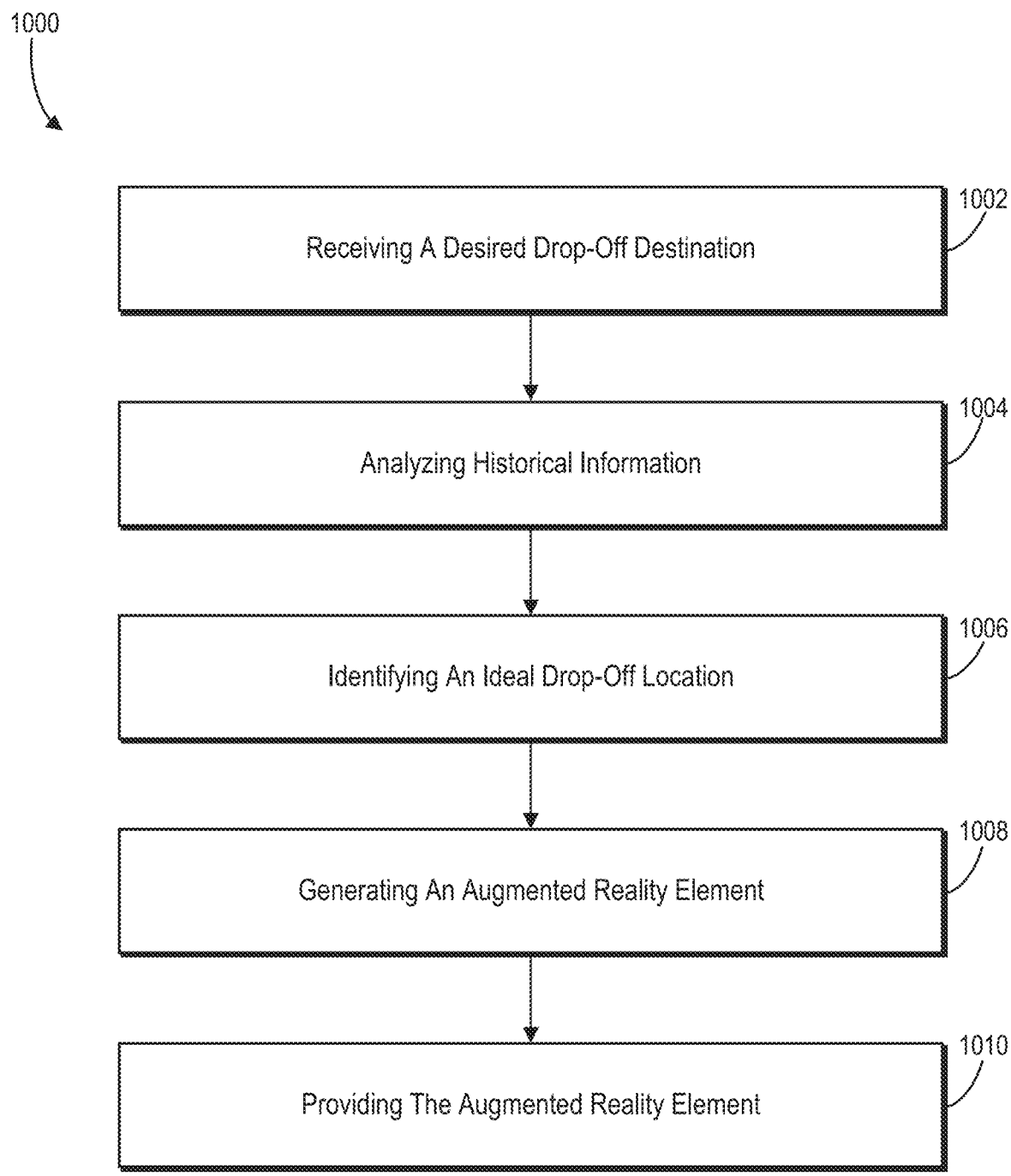
FIG. 10 illustrates a flowchart of a series of acts in a method of providing an augmented reality drop-off element in accordance with one or more embodiments.

FIGS. 1-8, the corresponding text, and the examples provide a number of different systems and methods that manage an augmented reality transportation system. In addition to the foregoing, embodiments can also be described in terms of flowcharts comprising acts and/or steps in a method for accomplishing a particular result. For example, FIGS. 9-10 illustrate flowcharts of exemplary methods in accordance with one or more embodiments. The methods described in relation to FIGS. 9-10 may be performed with fewer or more steps/acts or the steps/acts may be performed in any number of different orders or sequences. Additionally, the steps/acts described herein may be repeated or performed in parallel with one another or in parallel with different instances of the same or other similar steps/acts.

FIG. 9 illustrates a flowchart of a series of acts in a method 900 of providing an augmented reality element. For instance, the method 900 includes an act 902 of analyzing historical information. For example, the act 902 can involve analyzing, by a transportation system comprising at least one processor, historical information for an area associated with a passenger waiting for pickup, the historical information comprising information for a plurality of past rides having pickup locations within the area associated with the passenger waiting for pickup. The historical information can include one or more of historical traffic information or previous pickup location requests from previous passengers. The historical information can further include an indication from previous passengers or previous drivers of one or more no pickup locations.

The method 900 can includes acts for creating the historical information. For example, the method 900 can include an act of maintaining, for each transportation vehicle associated with the transportation system, a record of each passenger ride, the record including a start time, an end time, a passenger identifier, a driver identifier, a request location, an actual pickup location, a destination location, an actual drop-off location, and traffic information, wherein the historical information comprises a compilation of each maintained record of each passenger ride.

In addition, the method 900 includes an act 904 of identifying an ideal pickup location. For example, the act 904 can involve identifying, based on the analyzed historical information, an ideal pickup location within the area associated with the passenger.

The method 900 also includes an act 906 of generating an augmented reality element. For example, the act 906 can involve generating, for the identified ideal pickup location, an augmented reality element corresponding to a real-world environment surrounding the passenger and indicating the ideal pickup location.

Furthermore, the method 900 includes an act 908 of providing the augmented reality element. For example, the act 908 can providing, to the passenger by way of an augmented reality device, the generated augmented reality element or else providing instructions to the passenger client device to generate the augmented reality element.

The method 900 can further include an act of gathering historical information for an area surrounding a driver of the transportation system, the historical information comprising a plurality of previous pickup locations associated with a plurality of previous drivers. Additionally, the method 900 can include an act of determining, based on the gathered historical information for the area surrounding the driver and further based on the identified ideal pickup location, a driver pickup route to guide the driver to the ideal pickup location. Additionally still, the method 900 can include an act of generating an augmented reality element corresponding to a real-world environment surrounding the driver and indicating the ideal pickup location. The method 900 can still further include an act of providing, to the driver by way of an augmented reality device associated with the driver, the generated augmented reality element corresponding to the real-world environment surrounding the driver.

In additional or alternative embodiments, the method 900 can include an act of determining, based on the historical information, a plurality of maneuvers to instruct the passenger to navigate an ideal path to the ideal pickup location. In these or other embodiments, the method 900 can include an act of providing, to the augmented reality device for each of the plurality of maneuvers, an augmented reality maneuver element for each of the plurality of maneuvers to overlay within an augmented reality environment provided for presentation to the passenger.

The method 900 can further include an act of identifying, based on the historical information and further based on a driver location and a passenger location, a plurality of possible pickup locations for the passenger. Additionally, the method 900 can include an act of ranking each of the plurality of possible pickup locations according to one or more factors. The one or more factors can include one or more of a distance between the passenger and each of the plurality of possible pickup locations, a distance between a driver of a transportation vehicle assigned to pick up the passenger and each of the plurality of possible pickup locations, an estimated travel time for the passenger to navigate to each of the plurality of possible pickup locations, or an estimated travel time for the driver to navigate to each of the plurality of possible pickup locations.

Furthermore, the method 900 can include an act of determining, based on the ranking of the plurality of possible pickup locations, which of the plurality of possible pickup locations is the ideal pickup location. The method 900 can still further include an act of providing, to the augmented reality device, a coordinate location of the ideal pickup location for overlaying an augmented reality pickup location element at the coordinate location within a display of the augmented reality environment provided for presentation to the passenger.

The method 900 can include an act of providing, to the augmented reality device and based on the historical information, a coordinate location of the one or more no pickup locations for overlaying an augmented reality no pickup location element at the coordinate location. The method 900 can also include an act of identifying the plurality of previous pickup locations based on one or more of a previous passenger preference, a previous driver preference, a previous passenger location, a previous driver location, or previous traffic information.

Additionally, the method 900 can include an act of identifying a current driver location and current traffic information. The method 900 can also include an act of providing, to the augmented reality device, a coordinate of the current driver location and an indication of the current traffic information for overlaying an augmented reality driver location element and an augmented reality traffic element within a display of an augmented reality environment provided for presentation to the passenger.

FIG. 10 illustrates a flowchart of a series of acts in a method 1000 of providing an augmented reality element for a drop-off location. For instance, the method 1000 includes an act 1002 of receiving a desired drop-off destination. For example, the act 1002 can involve receiving, from a passenger client device associated with a passenger of a transportation vehicle of a transportation system, an indication of a desired drop-off destination.

In addition, the method 1000 includes an act 1004 of analyzing historical information. For example, the act 1004 can involve analyzing, by the transportation system and based on the received indication of the desired drop-off destination, historical information for an area associated with the desired drop-off destination, the historical information comprising information for a plurality of past rides having drop-off locations within the area associated with the desired drop-off destination.

Furthermore, the method 1000 includes an act 1006 of determining an ideal drop-off location. For example, the act 1006 can involve determining, based on the gathered historical information, an ideal drop-off within the area associated with the desired drop-off destination. The act 1006 may also include identifying an ideal drop-off location route for guiding the passenger and/or the driver to the ideal drop-off location.

The method 1000 of FIG. 10 further includes an act 1008 of generating an augmented reality element. For example, the act 1008 can involve generating, for the drop-off location route, an augmented reality element corresponding to the real-world environment surrounding the transportation vehicle and indicating the ideal drop-off location.

The method 1000 still further includes an act 1010 of providing the augmented reality element. For example, the act 1010 can involve providing, to a driver of the transportation vehicle by way of an augmented reality device, the generated augmented reality element. The method 1000 can also include an act of providing, to the passenger by way of the passenger client device, the generated augmented reality element.

The method 1000 can further include an act of providing, to the passenger reality device and the augmented reality device, a coordinate location of a popular destination for overlaying an augmented reality destination element at the coordinate location within an augmented reality environment provided for presentation to the passenger and to the driver, wherein the historical information further includes an indication of a popular destination based at least in part on the previous drop-off locations.

Additionally, the method 1000 can include an act of identifying, based on the historical information and further based on a driver location, a plurality of possible drop-off locations. The method 1000 can also include an act of ranking each of the plurality of possible drop-off locations according to one or more factors. Furthermore, the method 1000 can include an act of determining, based on the ranking of the plurality of possible drop-off locations, which of the plurality possible pickup locations is the ideal drop-off location. The method 1000 can still further include an act of providing, to the augmented reality device, a coordinate location of the ideal drop-off location for overlaying an augmented reality drop-off location element at the coordinate location within an augmented reality environment provided for presentation to the passenger and to the driver.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. For example, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, augmented reality devices, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
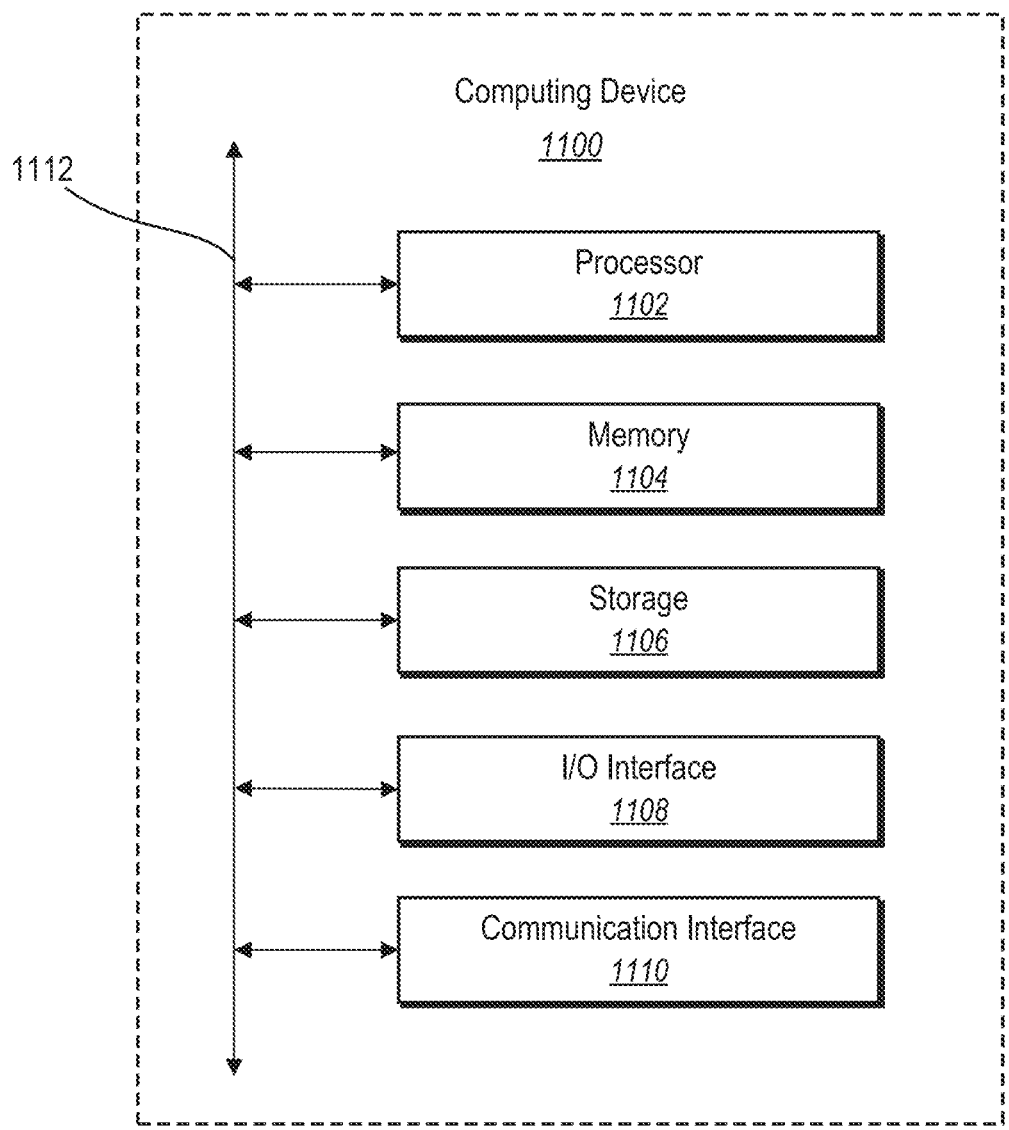
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that the Augmented reality transportation system 106 can comprise implementations of the computing device 1100. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

Figure 12:
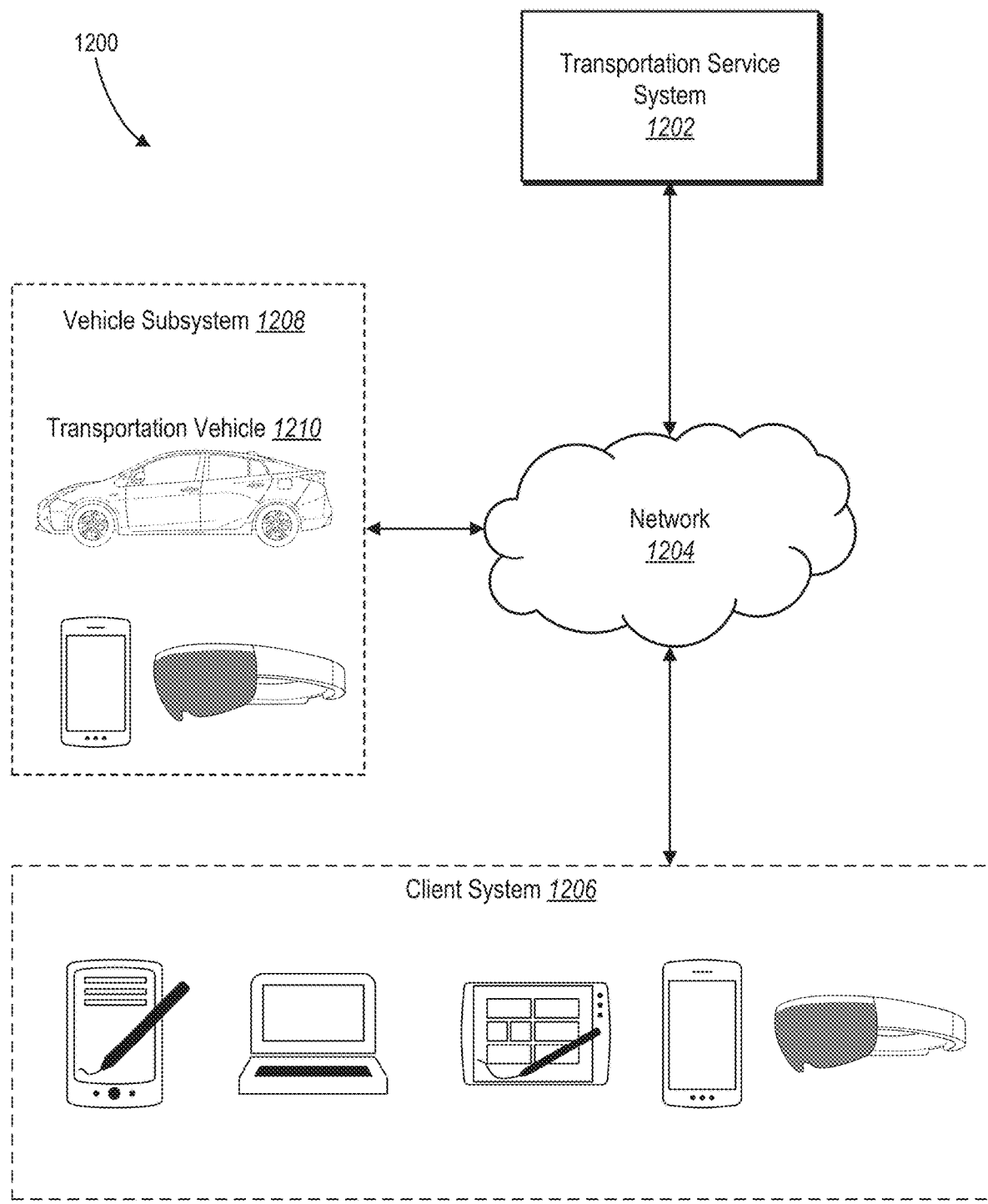
FIG. 12 illustrates an example augmented reality transportation system in accordance with one or more embodiments.

FIG. 12 illustrates an example network environment 1200 of an augmented reality transportation system. The network environment 1200 represents an example environment for augmented reality transportation system 106, discussed above and illustrated in FIG. 1. Network environment 1200 includes a client system 1206, a transportation service system 1202, and a vehicle subsystem 1208 connected to each other by a network 1204. Although FIG. 12 illustrates a particular arrangement of client system 1206, transportation service system 1202, vehicle subsystem 1208, and network 1204, this disclosure contemplates any suitable arrangement of client system 1206, transportation service system 1202, vehicle subsystem 1208, and network 1204. As an example, and not by way of limitation, two or more of client system 1206, transportation service system 1202, and vehicle subsystem 1208 communicate directly, bypassing network 1204. As another example, two or more of client system 1206, transportation service system 1202, and vehicle subsystem 1208 may be physically or logically co-located with each other in whole or in part. Moreover, although FIG. 12 illustrates a particular number of client systems 1206, transportation service systems 1202, vehicle subsystems 1208, and networks 1204, this disclosure contemplates any suitable number of client systems 1206, transportation service systems 1202, vehicle subsystems 1208, and networks 1204. As an example, and not by way of limitation, network environment 1200 may include multiple client system 1206, transportation service systems 1202, vehicle subsystems 1208, and networks 1204.

This disclosure contemplates any suitable network 1204. As an example, and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client system 1206, transportation service system 1202, and vehicle subsystem 1208 to communication network 1204 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client system 1206 may be an electronic device including hardware, software, or embedded logic components or a combination of two or more such components and capable of carrying out the appropriate functionalities implemented or supported by client system 1206. As an example, and not by way of limitation, a client system 1206 may include any of the computing devices discussed above in relation to FIG. 11. A client system 1206 may enable a network user at client system 1206 to access network 1204. A client system 1206 may enable its user to communicate with other users at other client systems 1206.

In particular embodiments, client system 1206 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1206 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 1206 one or more Hyper Text Markup Language (HTML) files responsive to the HTTP request. Client system 1206 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In other particular embodiments, client system 1206 may include an augmented reality device such as MICROSOFT HOLOLENS, SONY SMARTEYEGLASS, EPSON MOVERIO BT-200, GOOGLE GLASS, META1, OPTIVENT ORA-1, MAGIC LEAP, or others. Accordingly, the client system 1206 may use virtual three-dimensional rendering technology such as three-dimensional spatial mapping to provide a live direct or indirect view of a physical, real-world environment and to augment or supplement the elements/objects of the real-world environment by computer-generated sensory input such as sound, video, graphics, and/or GPS data.

In particular embodiments, transportation service system 1202 may be a network-addressable computing system that can host a ride share transportation network. Transportation service system 1202 may generate, store, receive, and send data, such as, for example, user-profile data, concept-profile data, text data, ride request data, GPS location data, driver data, passenger data, vehicle data, or other suitable data related to the ride share transportation network. This may include authenticating the identity of drivers and/or vehicles who are authorized to provide ride services through the transportation service system 1202. In addition, the transportation service system may manage identities of service requestors such as users/passengers. For example, the transportation service system may maintain passenger data such as driving/riding histories, personal data, or other user data in addition to navigation and/or traffic management services or other location services (e.g., GPS services).

In particular embodiments, the transportation service system 1202 may manage ride matching services to connect a user/passenger with a vehicle and/or driver. By managing the ride matching services, the transportation service system 1202 can manage the distribution and allocation of vehicle subsystem 102 resources and user resources such as GPS location and availability indicators, as described herein.

Transportation service system 1202 may be accessed by the other components of network environment 1200 either directly or via network 1204. In particular embodiments, transportation service system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation service system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1206, or a transportation service system 1202 to manage, retrieve, modify, add, or delete, the information stored in data store.

In particular embodiments, transportation service system 1202 may provide users with the ability to take actions on various types of items or objects, supported by transportation service system 1202. As an example, and not by way of limitation, the items and objects may include ride share networks to which users of transportation service system 1202 may belong, vehicles why users may request, location designators, computer-based applications that a user may use, transactions that allow users to buy or sell items via the service, interactions with advertisements that a user may perform, or other suitable items or objects. A user may interact with anything that is capable of being represented in transportation service system 1202 or by an external system of a third-party system, which is separate from transportation service system 1202 and coupled to transportation service system 1202 via a network 1204.

In particular embodiments, transportation service system 1202 may be capable of linking a variety of entities. As an example, and not by way of limitation, transportation service system 1202 may enable users to interact with each other or other entities, or to allow users to interact with these entities through an application programming interfaces (API) or other communication channels.

In particular embodiments, transportation service system 1202 also includes user-generated content objects, which may enhance a user's interactions with transportation service system 1202. User-generated content may include anything a user can add, upload, or send to transportation service system 1202. As an example, and not by way of limitation, a user communicates with transportation service system 1202 from a client system 1206. Chats may include data such as chat questions or other textual data, location information, photos, videos, links, music or other similar data or media. Content may also be added to transportation service system 1202 by a third-party through a "communication channel," such as another user's augmented reality device.

In particular embodiments, transportation service system 1202 may include a variety of servers, sub-systems, programs, modules, logs, and data stores. In particular embodiments, transportation service system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation service system 1202 may also include suitable components such as network interfaces, security mechanisms, load balancers, failover servers, management-and-network-operations consoles, other suitable components, or any suitable combination thereof. In particular embodiments, transportation service system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation service system 1202 and one or more client systems 1206. An action logger may be used to receive communications from a web server about a user's actions on or off transportation service system 1202. In conjunction with the action log, a third-party-content-object log may be maintained of user exposures to third-party-content objects. A notification controller may provide information regarding content objects to a client system 1206. Information may be pushed to a client system 1206 as notifications, or information may be pulled from client system 1206 responsive to a request received from client system 1206. Authorization servers may be used to enforce one or more privacy settings of the users of transportation service system 1202. A privacy setting of a user determines how particular information associated with a user can be shared. The authorization server may allow users to opt in to or opt out of having their actions logged by transportation service system 1202 or shared with other systems, such as, for example, by setting appropriate privacy settings. Third-party-content-object stores may be used to store content objects received from third parties. Location stores may be used for storing location information received from client systems 1206 associated with users.

In particular embodiments, the vehicle subsystem 1208 may include transportation vehicle 1210 such as a car such as a sedan, sport-utility vehicle, minivan, limousine, bus, or other vehicle capable of transporting one or more persons. For example, the vehicle subsystem can include a human-operated vehicle. A driver of the vehicle can perform maneuvers to pick up, transport, and drop off one or more passengers according to the embodiments described herein.

In certain embodiments, the vehicle subsystem 1208 can include an autonomous vehicle—i.e., a vehicle that does not require a human operator. In these embodiments, the vehicle subsystem 1208 can perform maneuvers, communicate, and otherwise function without the aid of a human driver, in accordance with available technology. In certain embodiments, the vehicle subsystem 1208 can include a hybrid system where limited human interaction is required in conjuction with computerized driving technology.

In particular embodiments, the vehicle subsystem 1208 may include a communication device capable of communicating with the client system 1206 and/or the transportation service system 1202. For example, the vehicle subsystem 1208 can include an on-board computing device communicatively linked to the network 1204 to transmit and receive data such as GPS location information, sensor-related information, passenger location information, or other relevant information.

The transportation vehicle 1210 of the vehicle subsystem 1208 may include a windshield or other device capable of rendering virtual objects to create an augmented reality environment for display to the driver and/or passengers. The augmented reality device of the transportation vehicle 1210 may be connected to an on-board computer or otherwise to a network-based computing device to enable the augmented reality device to generate the augmented reality environment by rendering three-dimensional virtual objects to appear as though they are placed within the setting of the real world seen through the windshield.

In particular embodiments, the vehicle subsystem 1208 may further include a sensor suite. For example, the sensor suite can be mounted on the top of the vehicle subsystem 1208 or else can be located within the interior of the vehicle subsystem 1208. In certain embodiments, the sensor suite can be located in multiple areas at once—i.e., split up throughout the vehicle subsystem 1208 so that different components of the sensor suite can be placed in different locations in accordance with optimal operation of the sensor suite.

In particular embodiments, the sensor suite can include a LIDAR and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a passenger.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating a transportation match between a requester device corresponding to a requester and a provider device corresponding to a provider;
determining, based on GPS information of the requester device, a location of the requester device corresponding to the requester;
generating an augmented reality passenger location element for display at the location of the requester device; and
providing the augmented reality passenger location element for display via a client device of the provider at the location of the requester device within a real-world environmental depiction visible via the client device.

2. The computer-implemented method of claim 1, further comprising:
detecting a modified location of the requester device; and
updating the augmented reality passenger location element to visually depict the modified location of the requester device.

3. The computer-implemented method of claim 2, further comprising providing the augmented reality passenger location element for display via the client device of the provider to indicate the modified location of the requester device.

4. The computer-implemented method of claim 1, wherein generating the augmented reality passenger location element comprises generating a visible three-dimensional shape for display at the location of the requester device within the real-world environmental depiction.

5. The computer-implemented method of claim 1, further comprising providing, for display together with the augmented reality passenger location element, one or more augmented reality passenger location route elements indicating a route for the provider associated with the client device to travel to the location of the requester device.

6. The computer-implemented method of claim 1, further comprising providing, for display together with the augmented reality passenger location element an action element indicating a command to the provider relative to the transportation match.

7. The computer-implemented method of claim 1, further comprising providing, for display together with the augmented reality passenger location element an augmented reality pickup location element.

8. A system comprising:
at least one processor; and
a non-transitory computer readable medium comprising instructions that, when executed by the at least one processor, cause the system to:
generate a transportation match between a requester device corresponding to a requester and a provider device corresponding to a provider;
determine, based on GPS information of the requester device, a location of the requester device corresponding to the requester;
generate an augmented reality passenger location element for display at the location of the requester device; and
provide the augmented reality passenger location element for display via a client device of the provider at the location of the requester device within a real-world environmental depiction visible via the client device.

9. The system of claim 8, further comprising instructions that, when executed by the at least one processor, cause the system to:
detect a modified location of the requester device; and
update the augmented reality passenger location element to visually depict the modified location of the requester device.

10. The system of claim 9, further comprising instructions that, when executed by the at least one processor, cause the system to provide the augmented reality passenger location element for display via the client device of the provider to indicate the modified location of the requester device.

11. The system of claim 8, further comprising instructions that, when executed by the at least one processor, cause the system to generate the augmented reality passenger location element by generating a visible three-dimensional shape for display at the location of the requester device within the real-world environmental depiction.

12. The system of claim 8, further comprising instructions that, when executed by the at least one processor, cause the system to provide, for display together with the augmented reality passenger location element, one or more augmented reality passenger location route elements indicating a route for the provider associated with the client device to travel to the location of the requester device.

13. The system of claim 8, further comprising instructions that, when executed by the at least one processor, cause the system to provide, for display together with the augmented reality passenger location element an action element indicating a command to the provider relative to the transportation match.

14. The system of claim 8, further comprising instructions that, when executed by the at least one processor, cause the system to provide, for display together with the augmented reality passenger location element, an augmented reality pickup location element.

15. A non-transitory computer readable medium comprising instructions that, when executed by at least one processor, cause a computing device to:
generate a transportation match between a requester device corresponding to a requester and a provider device corresponding to a provider;
determine, based on GPS information of the requester device, a location of the requester device corresponding to the requester;
generate an augmented reality passenger location element for display at the location of the requester device; and
provide the augmented reality passenger location element for display via a client device of the provider at the location of the requester device within a real-world environmental depiction visible via the client device.

16. The non-transitory computer readable medium of claim 15, further comprising instructions that, when executed by the at least one processor, cause the computing device to:
   detect a modified location of the requester device; and
   update the augmented reality passenger location element to visually depict the modified location of the requester device.

17. The non-transitory computer readable medium of claim 16, further comprising instructions that, when executed by the at least one processor, cause the computing device to provide the augmented reality passenger location element for display via the client device of the provider to indicate the modified location of the requester device.

18. The non-transitory computer readable medium of claim 15, further comprising instructions that, when executed by the at least one processor, cause the computing device to generate the augmented reality passenger location element by generating a visible three-dimensional shape for display at the location of the requester device within the real-world environmental depiction.

19. The non-transitory computer readable medium of claim 15, further comprising instructions that, when executed by the at least one processor, cause the computing device to provide, for display together with the augmented reality passenger location element, one or more augmented reality passenger location route elements indicating a route for the provider associated with the client device to travel to the location of the requester device.

20. The non-transitory computer readable medium of claim 15, further comprising instructions that, when executed by the at least one processor, cause the computing device to provide, for display together with the augmented reality passenger location element, an augmented reality pickup location element.

* * * * *